Feb. 14, 1961  G. ASSALINI  2,971,868
ION EXCHANGE PROCESS
Filed May 2, 1958  13 Sheets-Sheet 3

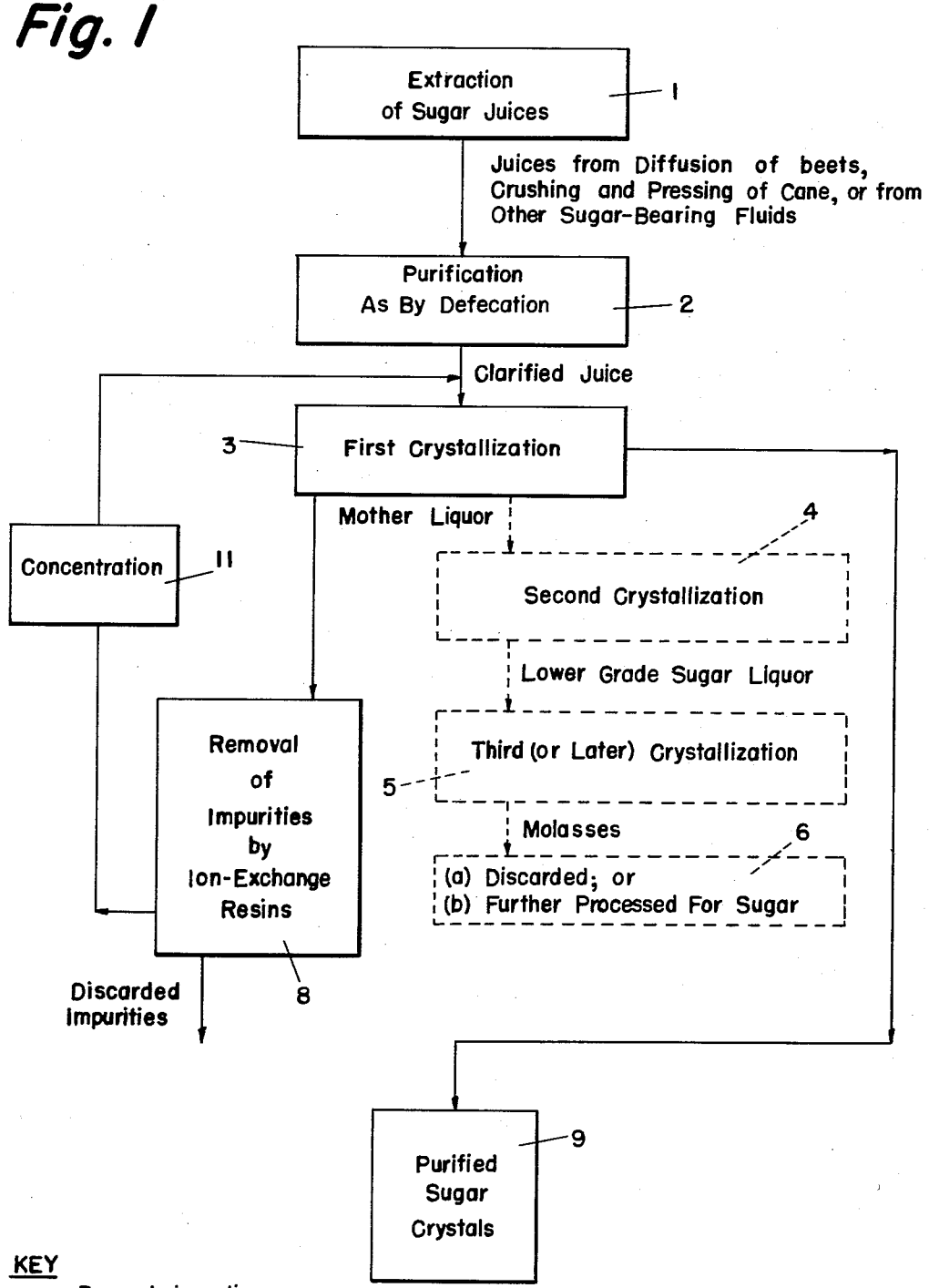

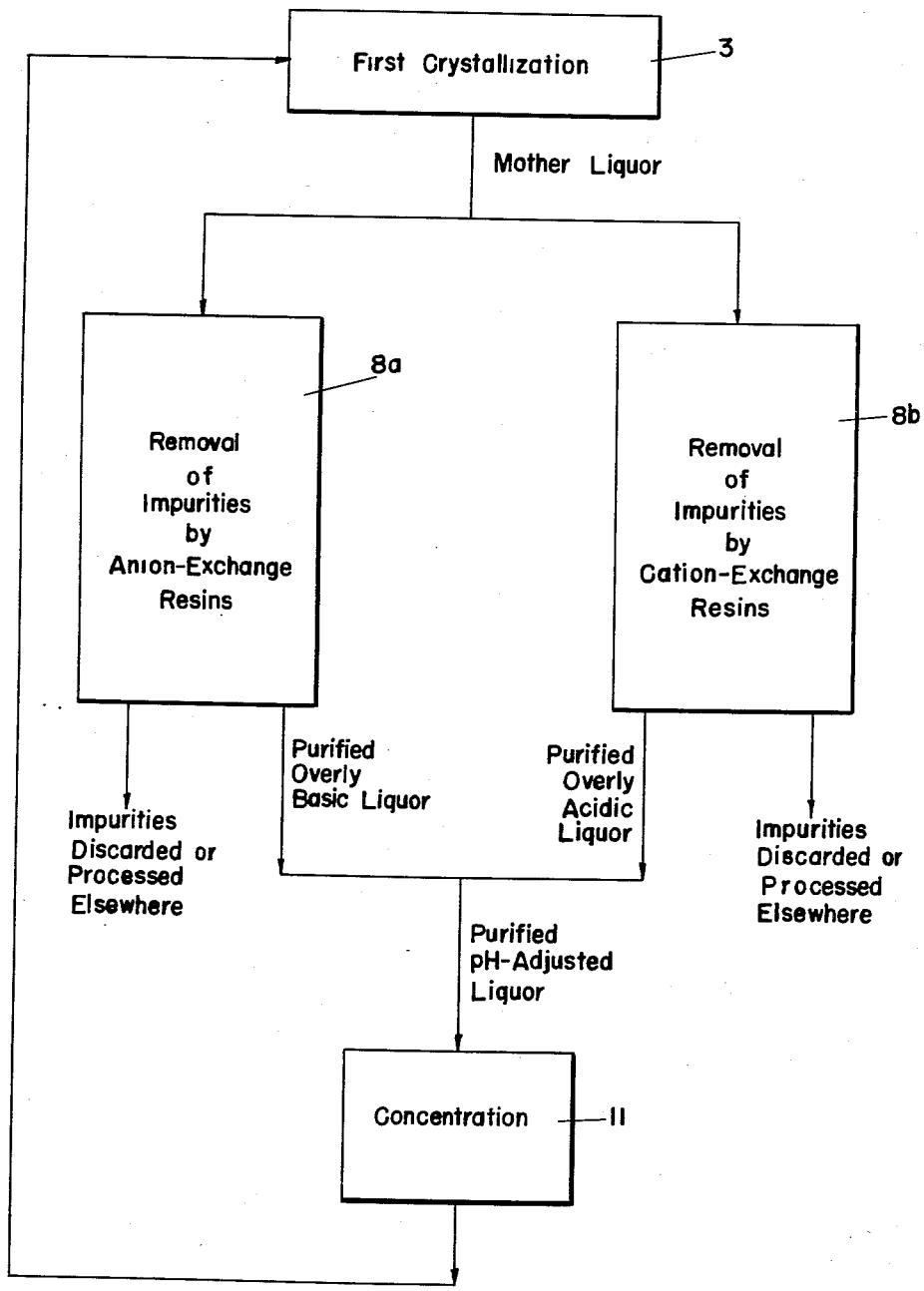

Feb. 14, 1961  G. ASSALINI  2,971,868
ION EXCHANGE PROCESS
Filed May 2, 1958  13 Sheets-Sheet 7
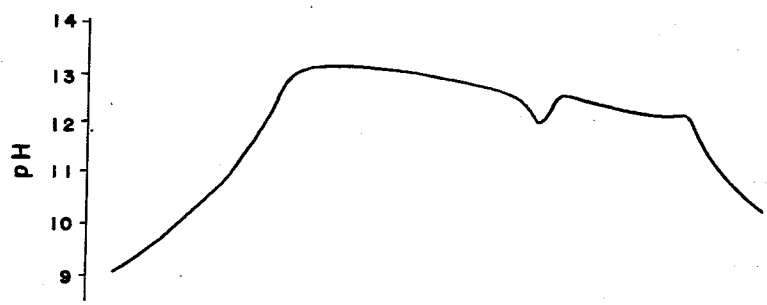
*Fig. 7*
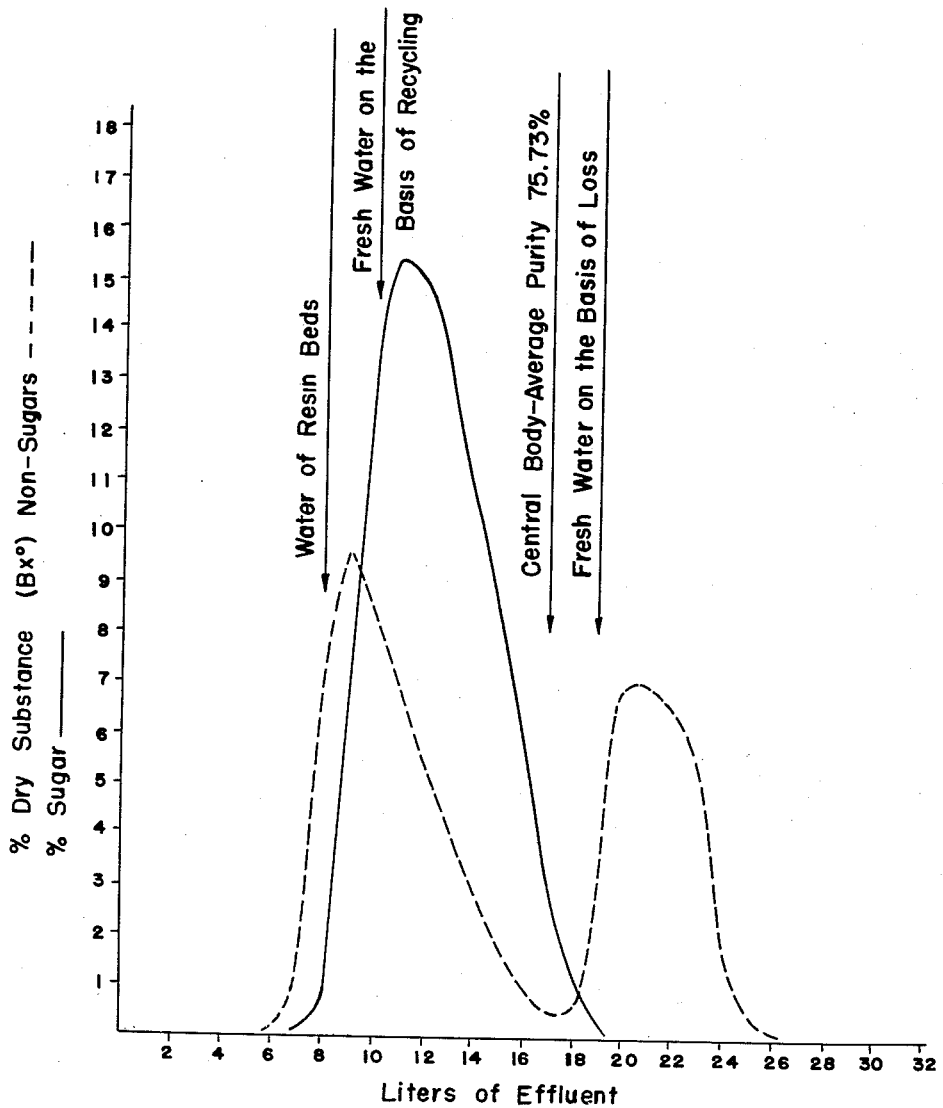

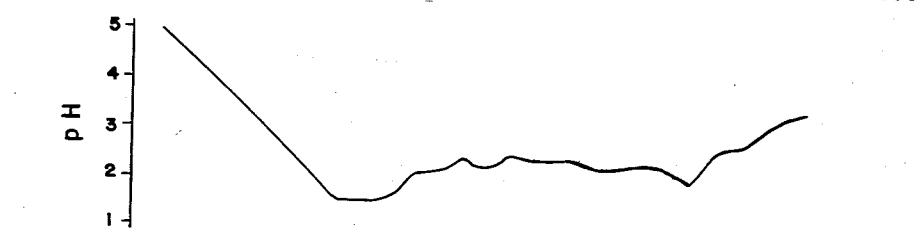
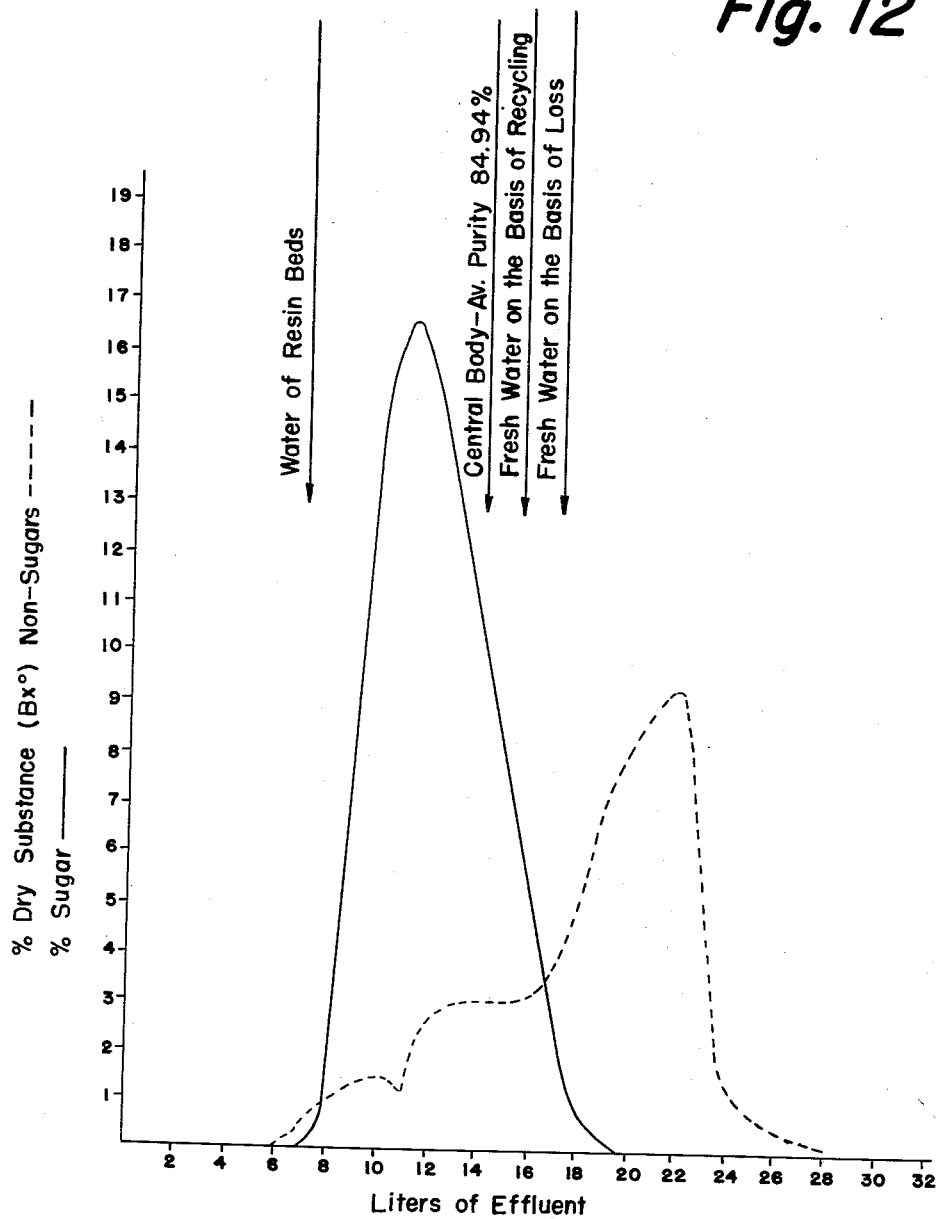
Fig. 12

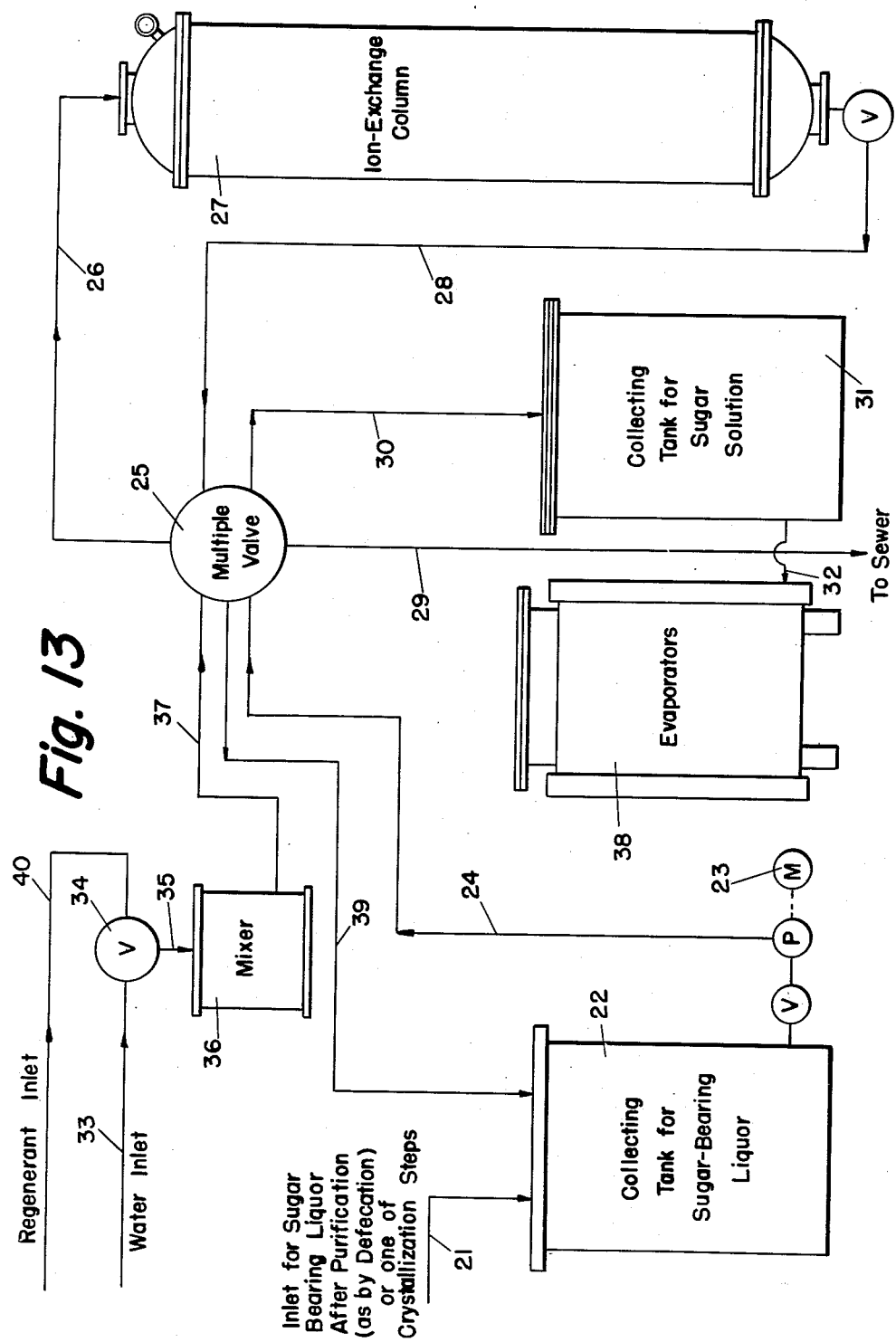

United States Patent Office 2,971,868
Patented Feb. 14, 1961

2,971,868
ION EXCHANGE PROCESS
Giuseppe Assalini, Genoa, Italy, assignor to Rohm & Haas Company, Philadelphia, Pa., a corporation of Delaware Filed May 2, 1958, Ser. No. 729,896
16 Claims. (Cl. 127—46)

This invention relates to an improvement in processes for manufacturing sugar. More particularly, it has reference to a method for producing sugars and edible sirups from sugar-bearing sources such as sugar cane and beets, fruit juices, corn products, and liquid molasses products including those products which are otherwise not suitable for human consumption.

In order to fully describe the commercial significance of the present invention with respect to the economies in operation effected thereby, it is convenient that a comparison be made with the processes of recovering sugar from sugar cane and beets which currently and for many, many years have been in vogue throughout the world. When the present invention is explained in the light of those prior art processes, the important advance which now has been made in the sugar manufacturing industry will become readily apparent. To assist in the description of the invention, reference will be made to the appended drawings in which:

Fig. 1 is a schematic illustration showing, in skeletal fashion, how the steps of the present invention may be substituted for certain steps in the prior art process which are thereby eliminated;

Fig. 2 is a schematic illustration of one form of the principal inventive advance over the prior art which is shown more generally in the complete manufacturing process depicted by Fig. 1;

Figure 3A:
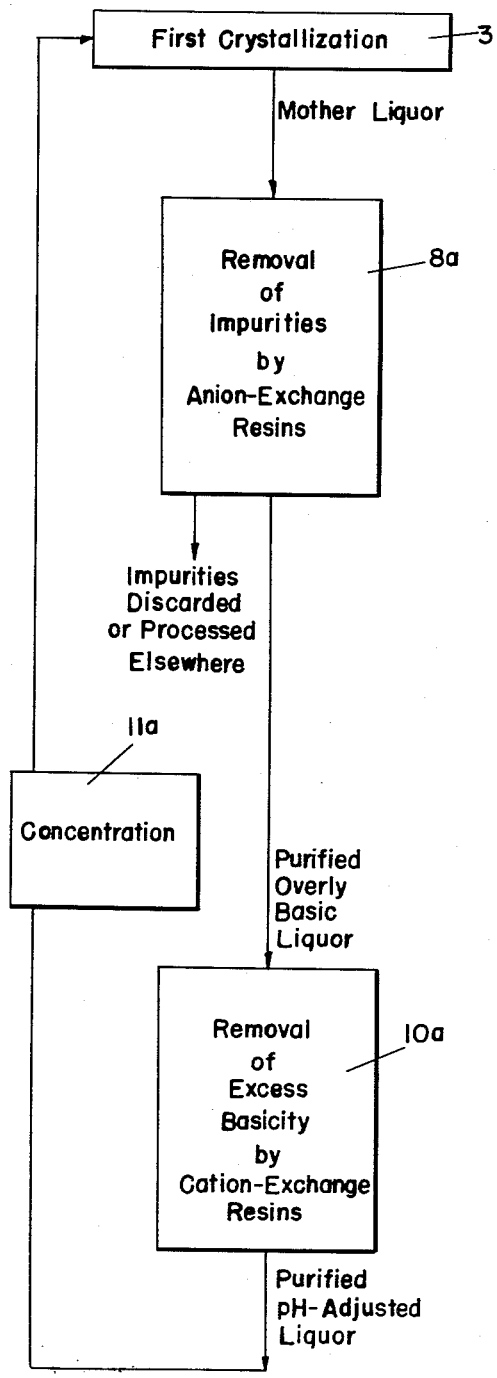
Figure 3B:
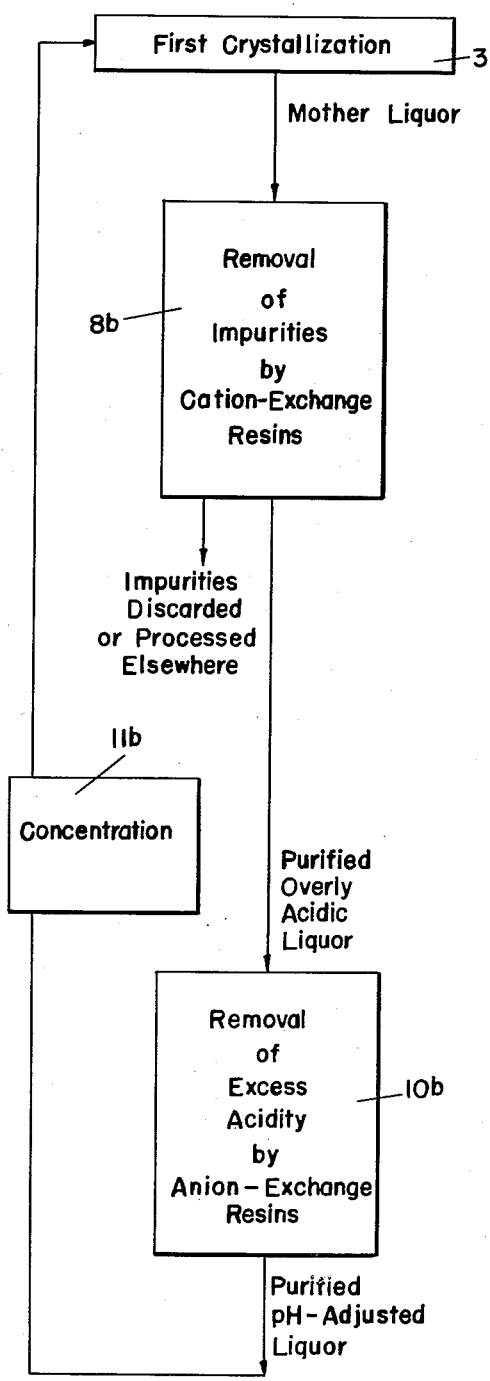
Figure 4:
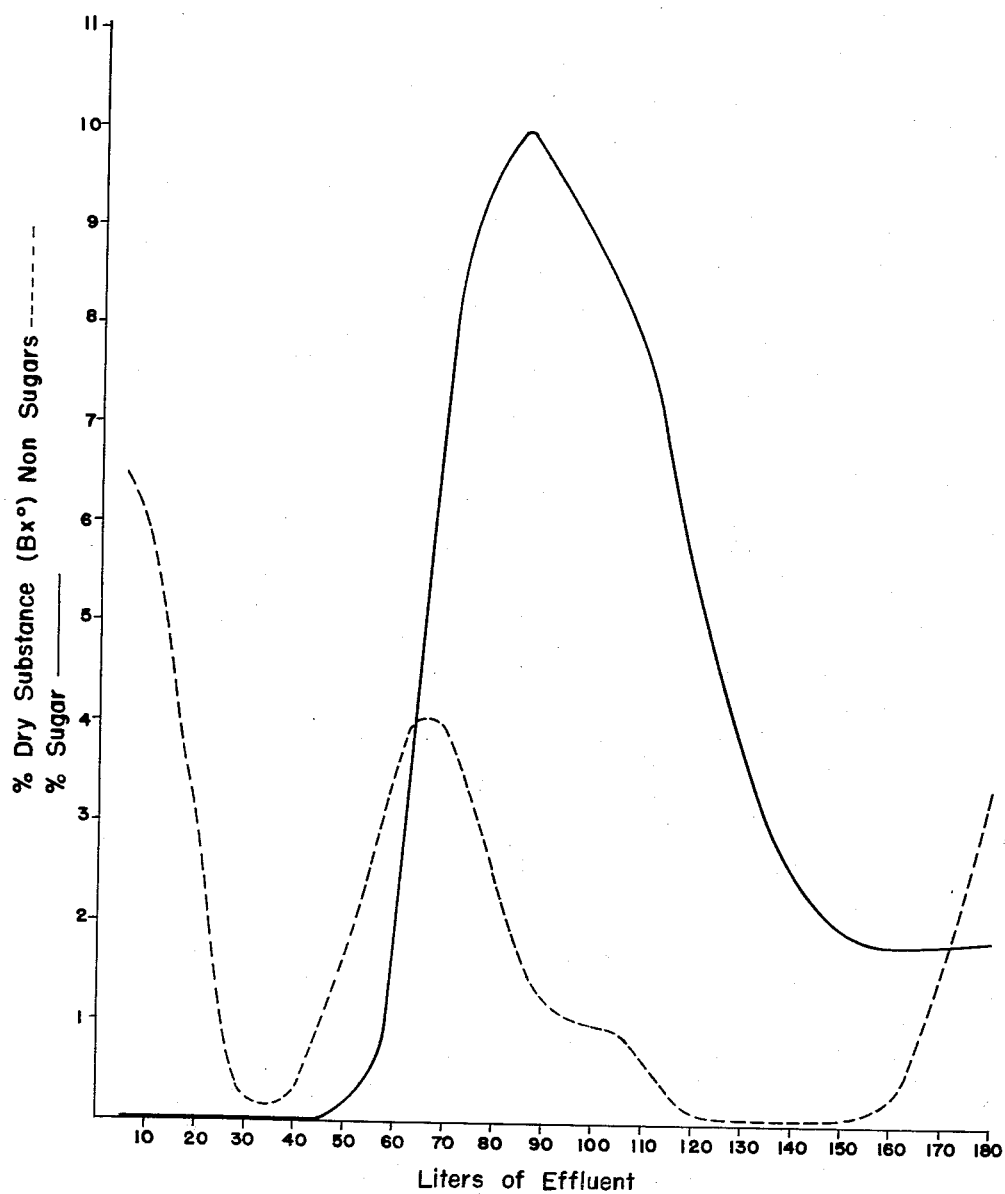
Figure 5:
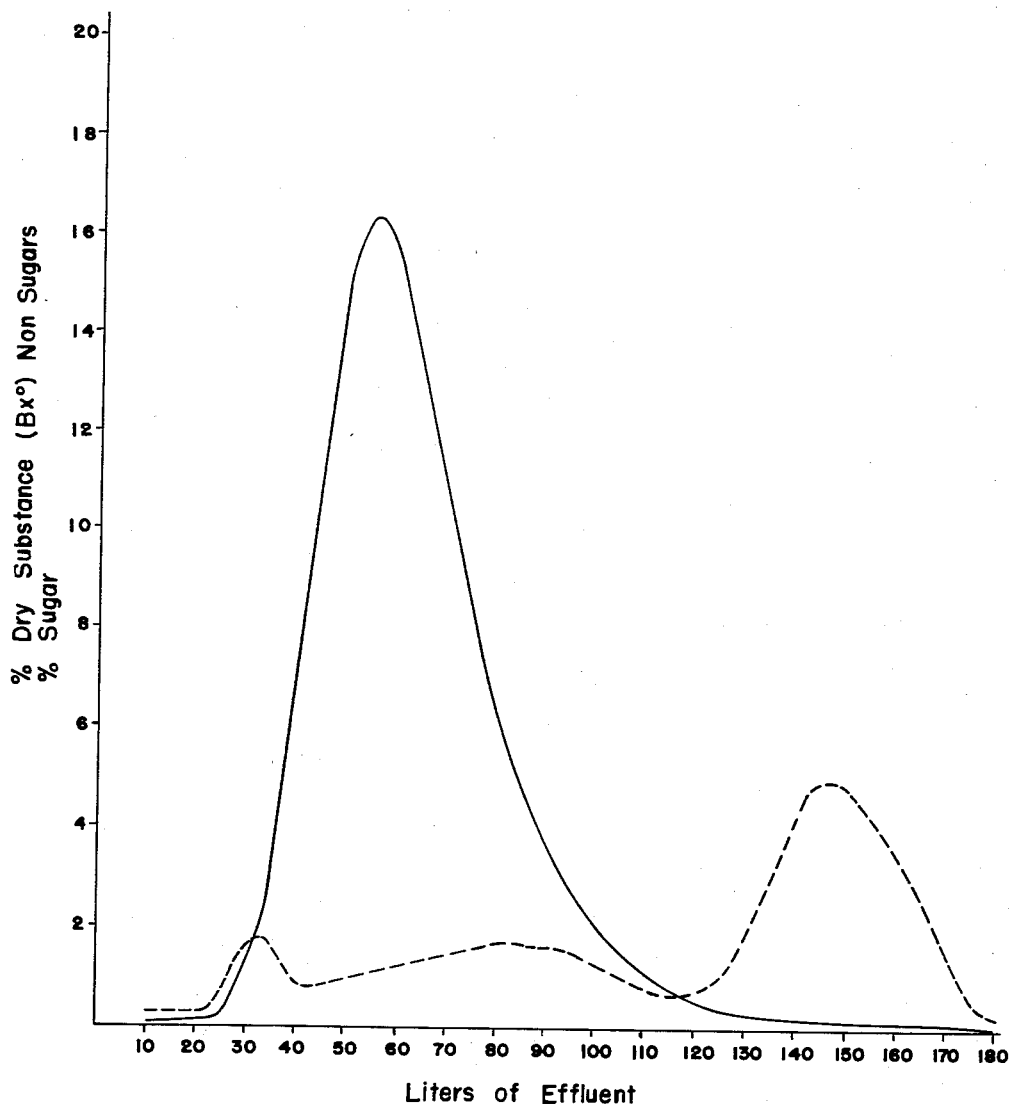
Figure 6:
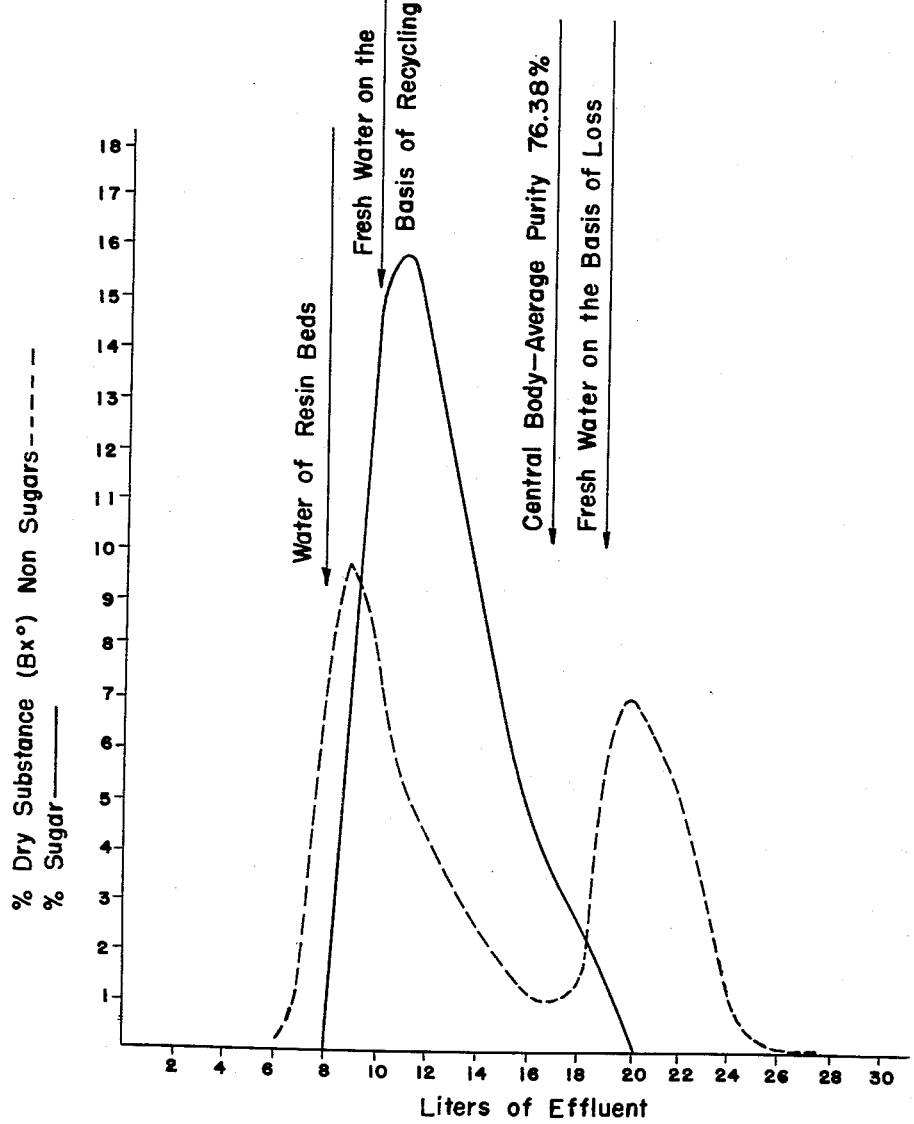
Figure 8:
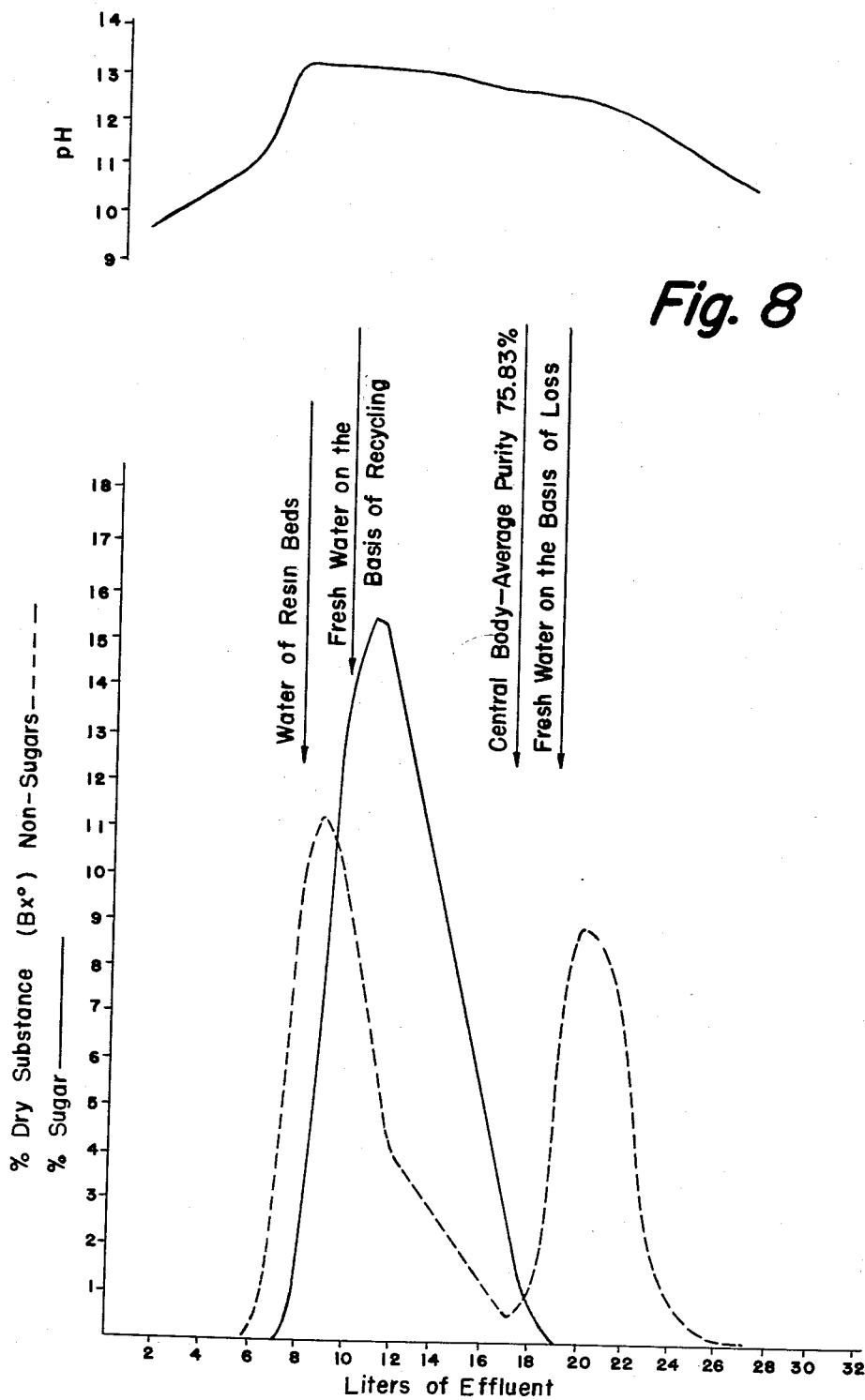
Figure 9:
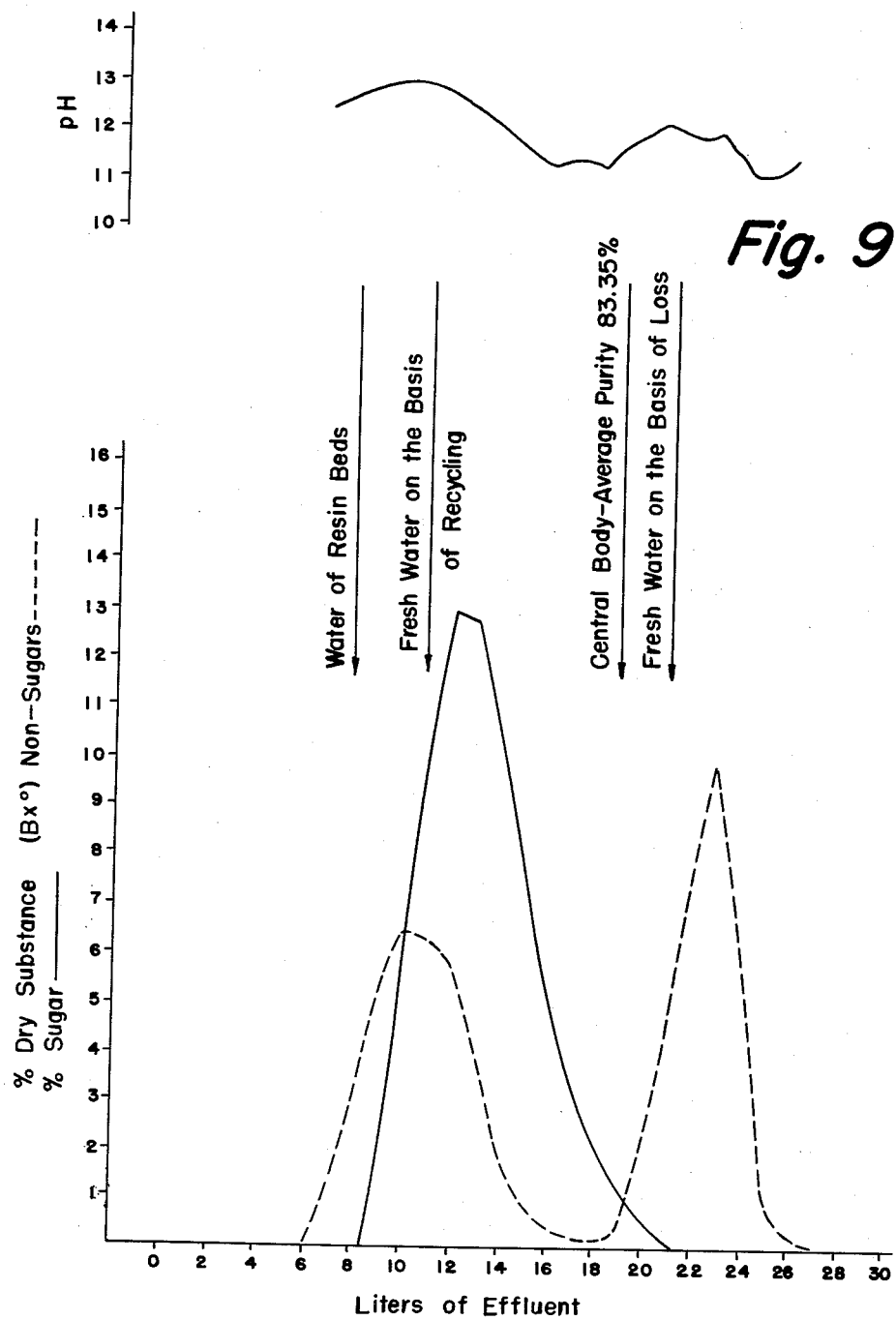
Figure 10:
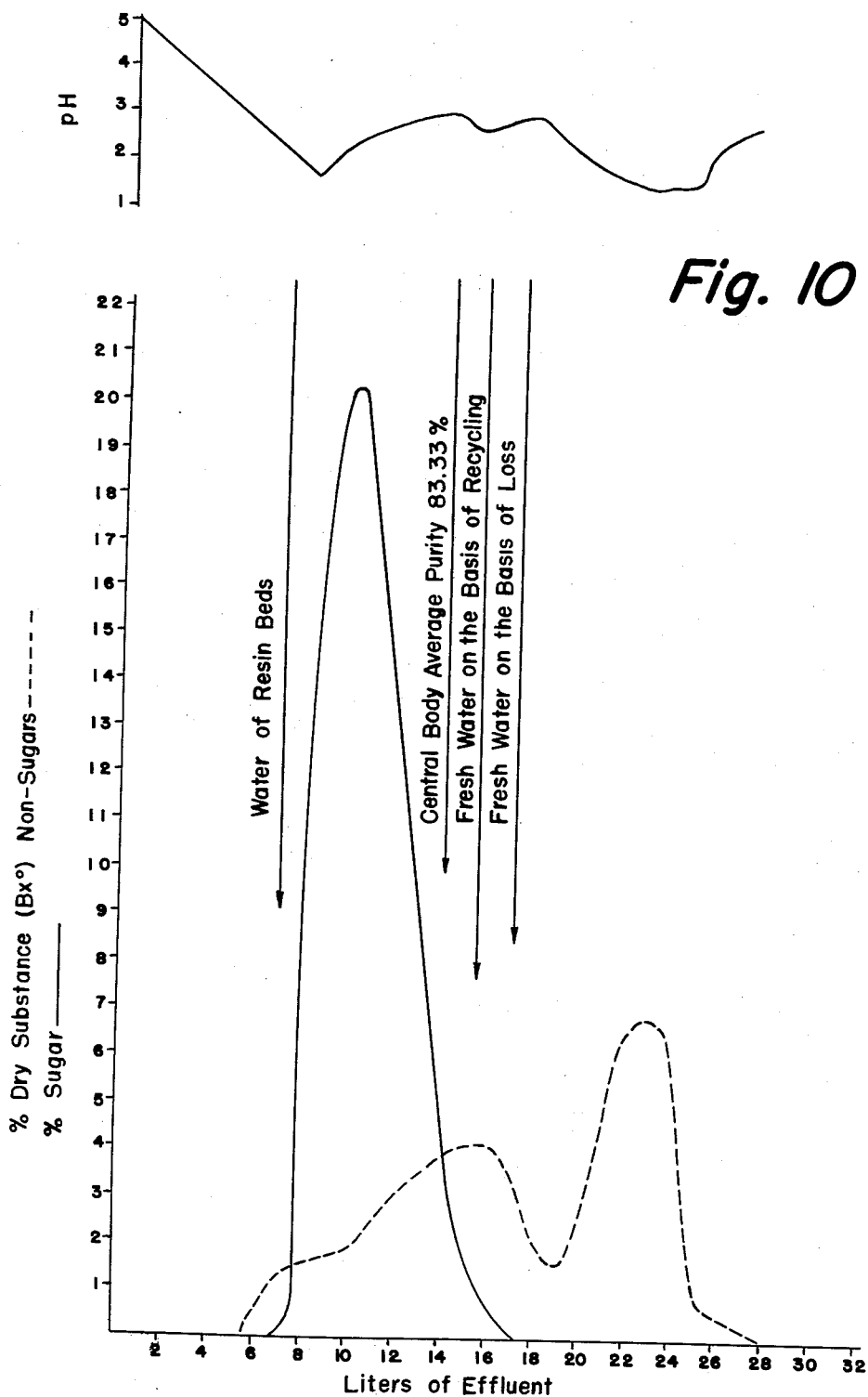
Figure 11:
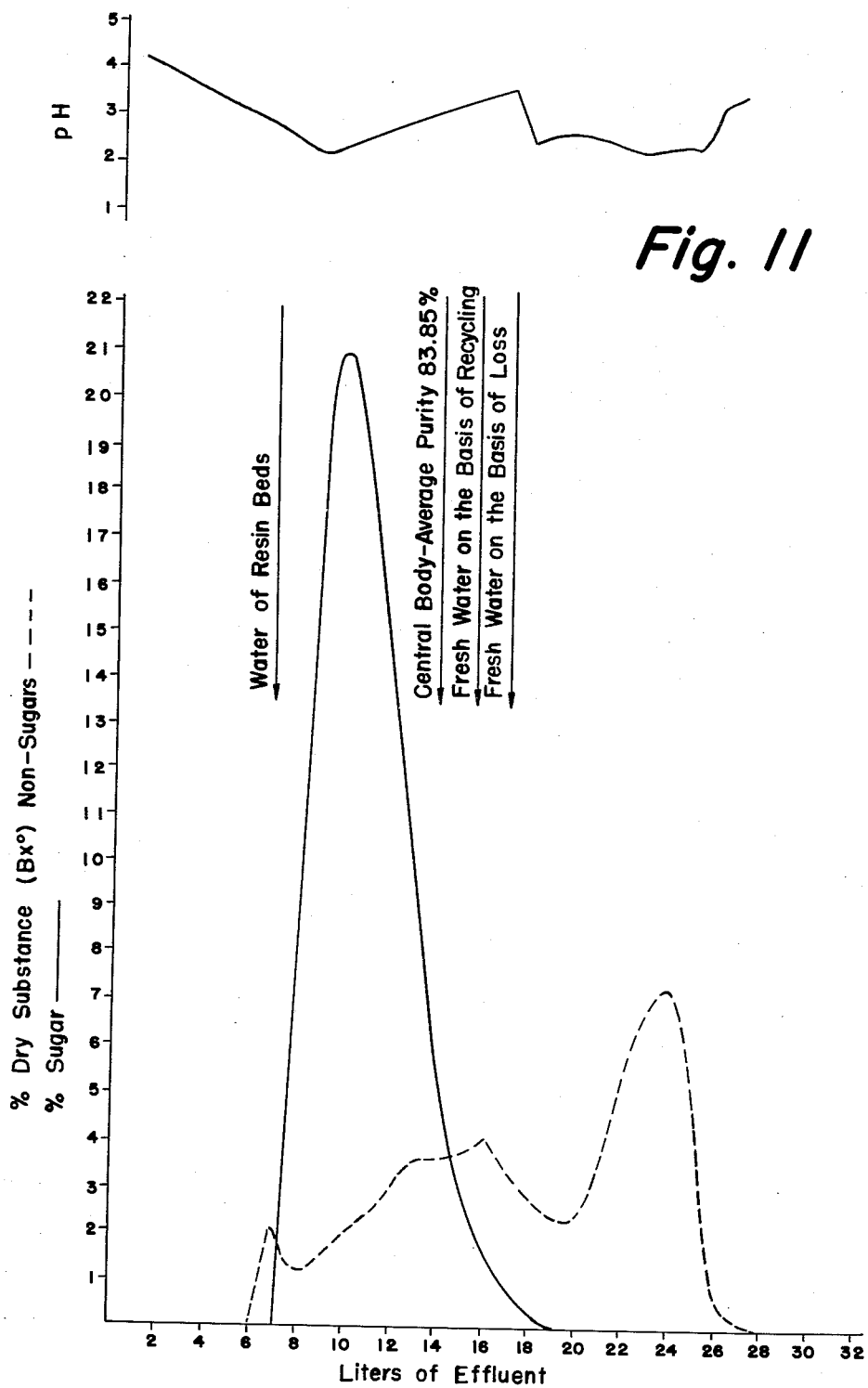

Fig. 3-A is a schematic illustration of another form of the principal advance over the prior art which has been made by the present invention;

Fig. 3-B is still another form of the major point of invention in the novel manufacturing process herein disclosed;

Fig. 4 is a graph showing the results of the process described in Example 4;

Fig. 5 is a graph showing the results of the process described in Example 5;

Fig. 6 is a graph showing the results of the process described in Example 6;

Fig. 7 is a graph showing the results of the process described in Example 7;

Fig. 8 is a graph showing the results of the process described in Example 8;

Fig. 9 is a graph showing the results of the process described in Example 9;

Fig. 10 is a graph showing the results of the process described in Example 10;

Fig. 11 is a graph showing the results of the process described in Example 11;

Fig. 12 is a graph showing the results of the process described in Example 12; and Fig. 13 is a diagrammatic view of a continuous processing commercial plant for the purification of sugar, utilizing the inventive method herein disclosed.

Referring to Fig. 1, the sugar manufacturing process begins with the extraction of sugar juices step 1 which may be from any of a number of possible sources such as the leaching of chopped-up beets to form a diffusion or crude juice, the crushing and pressing of sugar cane, or from the numerous fruits that contain sugar-bearing fluids. This extraction step is old in the art; the various methods for performing it are well known and are fully described in such references as McGinnis, Beet-Sugar Technology (Reinhold, New York city, 1951), and Spencer-Meade, A Handbook for Cane-Sugar Manufacturers and Their Chemists (Wiley, New York city, 1929).

The second or purification step 2 may also be one of a number of conventional procedures. This may suitably comprise defecation by such means as adding large quantites of lime, and then carbonating the mixtures so as to make possible the removal by filtration of certain impurities along with the particles of calcium carbonate thereby formed. This lime-carbonation technique is illustrated in such references as the texts by McGinnis and Spencer-Meade, and also U.S. Patents No. 2,697,041 and No. 2,776,229.

Another way known to the prior art for accomplishing the purification step 2 is a calco-sulfurous treatment which is somewhat similar to the lime-carbonation method in that it employs repeated filtrations and heat.

The thus clarified sugar-bearing juice, which normally has a sugar purity on the order of 88–95 percent based on the solids present, is then submitted to a first crystallization treatment 3 in a suitable evaporating apparatus. A portion of the sugar which is submitted to this first crystallization step is recovered in the form of pure crystals in a suitable receptacle 9 therefor. The practice, prior to the present invention, has been to pass the mother liquor remaining after this first crystallization through a second, third, and, if necessary, additional crystallization steps, each time resulting in the additional recovery of sugar crystals. The mother liquor has a sugar purity of about 75–85 percent, based on the solids present, as it is passed into the evaporators for the second crystallization 4. This sugar purity is reduced to about 70–75 percent after that second crystallization step, and to about 60 percent in the molasses which remains after the third crystallization step 5. In many sugar manufacturing processes, this thick molasses sirup is discarded as a source of further quantities of crystalline sugar, as represented at 6 in Fig. 1. As is also indicated at that point in the schematic diagram, the molasses has alternatively been further processed so as to obtain sugar or valuable by-products, such as food supplements, therefrom. However, such processing of molasses to obtain purified edible sugar crystals heretofore has been a most unattractive proposition from an industrial standpoint.

In accordance with my present invention, I have provided a procedure which eliminates the need for the crystallization steps which, as shown in Fig. 1, normally follow the first crystallization step 3. The improved process is so efficient that it substantially eliminates the need for the disposal or further processing of molasses to obtain sugar therefrom, although it is still possible to obtain the nutrients contained in the residue for use in animal feeds, etc. The first two or three steps with which the prior art is familiar, namely, extraction 1, purification 2, and the first crystallization 3, may be practiced in any manner that is preferred. The point of departure from the prior art methods for manufacturing sugar which will be most generally practiced is the point at which the mother liquor is passed (see Fig. 1) from the first crystallization step 3 into one or more ion-exchange columns for accomplishing the removal of the impurities so that the purified liquor resulting therefrom can then be crystallized, either by passage through a separate evaporative device or by cycling the liquor back to the evaporators employed for the first crystallization step 3. The invention, however, is not limited to the treatment of the mother liquor after the first crystallization. In some circumstances it may be desirable to treat the clarified juices from the purification step 2 or even the diffusion juice from step 1 without defecation. In other circumstances it will be desirable to submit the mother liquor to a second crystallization as illustrated at 4 of Fig. 1 and to treat the liquor from this second crystallization in accordance with this invention. A particularly valuable application of the invention is in the treatment of molasses from various sources. I have found that this improved process makes it possible to obtain as purified sugar crystals substantially all of the 10-15 percent sugar normally present in the diffusion or other juices from extraction step 1, the residue of molasses which remains at the end of my novel process being relatively inconsequential.

As further illustrated in the drawings, there are several alternative methods for practicing the step of removing impurities by ion-exchange resins which has only been represented in a general way at 8 in Fig. 1. For example, as shown in Fig. 2, the mother liquor from the first crystallization step 3 can suitably be divided into two portions, generally although not necessarily, in substantially equal amounts. One portion of the mother liquor is passed through a column 8a containing an anion-exchange resin. The other portion of the mother liquor is passed through another column 8b containing a cation-exchange resin. The impurities in the mother liquor are substantially reduced by each of these resin columns and either discarded or processed in other ways if it is desired to recover some of the other components (such as amino acids) thereof. The sugar-containing liquor in the effluent from the anion-exchange column is highly basic in nature. This is objectionable because the heat applied during the concentration step would tend to convert the sucrose to sucrate salts corresponding to the cations present in solution which, in turn, will not be recoverable as pure sugar upon crystallization and thus would cause loss of a considerable amount of sugar. In an analogous manner, the sugar-containing effluent from the cation-exchange column is highly acidic in nature; and this is objectionable because it will, upon long exposure to elevated temperatures as in the concentration step, cause inversion and therefore loss of the desired sugar.

The overly basic pH of the liquor from the anion-exchange column can, of course, be adjusted by the addition of acid thereto. Likewise, the overly acidic pH of the liquor from the cation-exchange column can be adjusted by the addition of a base thereto. But such additions are strongly objectionable because they would result in the introduction of undesirable inorganic matter to the sugar-containing liquor and thus offset much of the purification which was accomplished by passing the mother liquor through the two ion-exchange columns to begin with. It is preferred, therefore, to mix, in the proper or necessary proportions, the purified liquors from each of the columns so as to obtain a single purified liquor of proper pH. This pH-adjusted, purified, sugar-containing liquor is processed through a concentration step 11 and then cycled (a) either to the main stream of clarified juice obtained from step 2 and through the same evaporators employed for the first crystallization step 3 (as shown illustratively in Fig. 1), or (b) is routed directly to one of the evaporative devices in the system (as shown in Fig. 2) for evaporation of the liquor and crystallization of pure sugar. The former is the preferred technique as it makes for a more efficient commercial type of operation; however, the latter is entirely acceptable in many situations. As mentioned above, this crystallization can be done in separate apparatus and the crystals obtained therefrom combined with the sugar obtained from the first crystallization step 3.

Another alternative to the method illustrated in Fig. 2 is to pass the mother liquor from the first crystallization step 3 into an ion-exchange column (such as shown at 8a in Fig. 3-A and at 8b in Fig. 3-B) to remove the impurities from the liquor; and then, instead of having to adjust the pH of the overly basic or acidic liquor by the technique just described and shown in Fig. 2, the pH adjustment can conveniently be accomplished by passage of the liquor through another ion-exchange column having resins which are capable of effecting its substantial neutralization. This system can alternatively follow either of the procedures schematically represented in Figs. 3-A and 3-B. In the former, the mother liquor first passes through the column of anion-exchange resins represented at 8a; and the purified, overly basic, sugar-containing liquor issuing therefrom is then passed into a cation-exchange column 10a. The resulting effluent, which is the purified sugar-containing liquor that has been adjusted to the proper pH, is then routed either to the evaporators employed in the first crystallization step 3 (as shown in Fig. 3-A), or to separate evaporative equipment, if desired.

In a directly analogous manner, the modification of the invention just described may be carried out in still another way by following the diagram shown in Fig. 3-B. The only difference is that the mother liquor is first passed into a cation-exchange column 8b and the purified, overly acidic, sugar-containing effluent therefrom is then passed into an anion-exchange column 10b. The liquor issuing from this last column has the proper pH for maximum sugar production, and may then be passed either through the same evaporators employed in the first crystallization step 3 (as shown in Fig. 3-B) or optionally may be routed to separate evaporative equipment.

With the general outline of how the present invention may be used to modify the conventional practice in mind, a description will now be given of the various ion-exchange resins which are employed in columns 8a, 8b, 10a, and 10b, as well as an explanation of the process steps involving the use of those resin columns. Referring first to column 8a, as employed in either of the process modifications represented by Fig. 2 and Fig. 3-A, any one of a number of well-known commercially available anion-exchange resins may be employed, although it is generally preferable to use one of the quaternary amine types. To condition the bed for use, it is first converted to the salt form, preferably the chloride form; and there is then passed into the bed sufficient alkaline regenerant to form a band in the upper half of the column in which the resin has been converted to the OH⁻ form. The depth of this band can be varied but, generally, it will constitute approximately the uppermost fourth of the column. Up to about one half of the column would be satisfactory. Rinse water is then passed through the column to flush the salts formed by the regenerant and the column is ready for the sugar solution.

After the sugar solution is admitted to the column, water is again pumped through, this time in amounts equal to from two to four or more times the volume of the sugar solution. Then an alkaline regenerant (such as NaOH, KOH, $NH_4OH$, $Na_2CO_3$ et al.) is again admitted to create a band of resin in the hydroxyl form in the upper half of the column, the column rinsed, and the cycle is repeated. Considering the influent liquid there are four distinct stages to the complete cycle; the sugar solution, the flushing of sugar solution, the regenerant, and the flushing of the regenerant. As these four liquids pass through the column, the sugar and the impurities in the sugar solution become redistributed in such manner as permits the separation of fractions of the effluent at least one of which has a ratio of sugar to impurities substantially higher than in the influent and in another of which this ratio is much lower. It is usually desirable to divide the effluent into four cuts which, however, do not correspond to the four stages of influent. One cut of effluent will be substantially devoid of sugar but will contain substantial quantities of the impurities. Then a cut may be taken in which the ratio of sugar to impurities is quite high. This may be followed (and preceded if desired) by a cut in which the impurities and sugar are in a ratio that warrants their being recycled through the column. Then finally comes a cut in which the sugar content is quite low. This cut may, if desired, be combined with the first cut of the next cycle. The cut of effluent containing the sugar will have a pH of the order of 11 to 12 or more. This pH is excessive as a range of 7 to 9 is generally desired and makes possible the maximum separation of the sugar from the purified liquor with the least destruction of sugar by side reactions. Under some conditions the pH may be as low as 5.

As explained above in general outline, the pH of this liquor from the anion-exchange column can be reduced by one of a number of ways. Two techniques which are within the scope of the present invention are (1) the mixture of a portion of that overly basic liquor with a portion of the excessively acidic liquor which issues from column $8b$ as in Fig. 2; or (2) to pass the basic liquor through a cation-exchange column as at $10a$ in Fig. 3–A. In the latter case, it is preferable to use as the cation-exchange resin in column $10a$ a weakly acidic type such as one of the commercially available carboxylic materials, although a strongly acidic cation exchanger could be employed if desired. In the latter case, however, it may be necessary to exercise some special precautions in order to be certain that the purified, sugar-containing effluent is adjusted to within the required pH range of 5 to 9 and not made overly acidic.

The corresponding alternative procedure to the one just described would employ any one of a number of well-known and commercially available cation-exchange resins in column $8b$ (Figs. 2 or 3–B), although the polystyrene nuclear sulfonic acid type are preferable. The major portion of the resin should be in the salt form, preferably in the sodium form. A band of the resin located in the upper half of the column is in the H+ form at the outset. The depth of this band may be varied, but, generally, it will constitute as much as the uppermost fourth or even half of the column. The influent to the cation-exchange resin bed is in four stages analogous to those described above for the anion-exchange resin bed and similarly, but in a substantially different manner, the sugar and impurities in the sugar solution are redistributed in a way that permits of one cut of effluent being separated in which the ratio of sugar to impurities is quite high and another cut in which the ratio is quite low. The cut of effluent containing the sugar will have a pH of the order of 1 to 3 or above. The regenerant, in this instance, will be an acid such as dilute $H_2SO_4$, $HNO_3$, $H_3PO_4$, or HCl.

As previously indicated, this pH can be brought up to the proper amount in any one of a number of ways. Two techniques which are within the scope of the present invention are (1) the mixture of a portion of that acidic liquor with a portion of the excessively basic liquor which issues from column $8a$ as in Fig. 2; or (2) to pass the acidic liquor through an anion-exchange column as at $10b$ in Fig. 3–B. In the latter case, it is preferable to use as the anion-exchange resin in column $10b$ a weakly basic type such as one of the commercially available polyamine materials, although a strongly basic anion exchanger could be employed, if desired. In the latter case, however, it may be necessary to exercise some special precautions in order to be certain that the purified, sugar-containing effluent is adjusted to within the desired pH range.

The invention, as far as I have been able to determine, is at least in part caused to operate as above outlined by virtue of a chemical mechanism which is substantially as follows. The amino acids and most of the organic complexes which constitute such a great part of the impurities in the sugar-containing liquor are amphoteric in nature. Amphoteric compounds show an acidic or basic dissociation, i.e., they have a tendency to pass from a cationic to an anionic function, and vice versa, with changes in the acidity or alkalinity of the solution. The change from a cationic to an anionic function occurs directly with the pH of the solution; as a corollary, the change from an anionic to a cationic function occurs inversely with respect to the pH. Thus, in the present invention, the influent sugar-containing liquor which passes through the alkaline band at the top of the anion-exchange column $8a$ is maintained in the alkaline form, giving the amino acids and organic complexes present in the liquor an anionic function and at the same time breaking the organo-metallic complexes. Similarly, the influent liquor which passes through the acid band at the top of the cation-exchange column $8b$ is converted to an acidic condition, giving the amino acids and organic complexes present a cationic function and at the same time breaking the organo-metallic complexes.

The result of the action just described is to cause a redistribution of the sugar and the amino acids and other organic impurities of like characteristics, as will be apparent from the following description and examples.

In succeeding steps, a small quantity of acid is added to the top of the cation-exchange resin column so as to restore the H+ form of the original acid band, and a small quantity of a basic solution is added to the anion-exchange resin column so as to restore the OH− form of the original alkaline band. The restoration of the original pH values of these bands causes the amino acids in the sugar-containing liquor of the next cycle to pass through their respective iso-electric points. The amino acids coming into contact with the H+ band become cationic and are absorbed by the cation-exchange resins in the salt form below that acidic band; the amino acids coming into contact with the OH− band become anionic and are absorbed by the anion-exchange resins in the chloride form below that alkaline band. Examples of such amino acids and their iso-electric points are glutamic (pI 3.2), aspartic (pI 2.8), etc. As those points are successively reached the amino acids become susceptible to absorption by the resins. The restoration of the original pH of the resin's acid band in the one column, and the resin's alkaline band in the other column, additionally serves to remove any of the amino acids from the previous cycle by means of cation exchange in the former and by anion exchange in the latter.

In a continuous manufacturing operation, the apparatus employed which make up the full-scale plant can take a form which generally follows any of the arrangements schematically represented in the drawings. Although any skilled chemical engineer could set up a suitable plant with the foregoing information and appended drawings before him, it may help to refer to one embodiment as depicted in the simplified diagram in Fig. 13. For the sake of simplicity, only one ion-exchange column 27 has been represented. However, it should be understood that in actuality a bi-column arrangement is employed, one containing anion-exchange resins and the other containing cation-exchange resins. These columns can be employed in the bi-lateral arrangement shown in Fig. 2 or the tandem constructions shown in Fig. 3–A and in Fig. 3–B. As illustratively shown in Fig. 13, the sugar-containing liquor enters through pipe 21 into a collecting tank 22. A pump 23 draws the sugar-bearing liquor from the tank and feeds it through pipe 24 to a multiple valve 25, and then through pipe 26 to the ion-exchange columns illustratively represented at 27. Fresh water is supplied to column 27 through pipe 33, passing through a two-way valve 34, pipe 35, mixer 36, pipe 37, the multiple valve 25, and pipe 26. The quantity of water used, which may run from two to four times that of the sugar-bearing liquor already introduced to the column, is regulated by controlling valves 34 and 25.

The regenerant, which preferably is a 5 to 11 percent sulfuric acid solution, is supplied to the cation-exchange resin column as through pipe 40, passing through valve 34, pipe 35, mixer 36, pipe 37, valve 25, and pipe 26. The mixer 36 serves to mix the water and acid thoroughly before further transmittal of the acid solution. Similarly, the alkali, which preferably is a dilute sodium hydroxide solution, is supplied to the anion-exchange resin column as through inlet pipe 40, valve 34, pipe 35, mixer 36, and so on. In practice, of course, separate mixers, pipes and valves would be employed to convey the acid to the cation-exchange column and the alkali to the anion-exchange column.

The continuous process basically employs the four principal, successive steps of the novel method which were described above. If it is desired to discard the first effluent, it may be discharged in the sewer by passing it through pipe 28, valve 25 and pipe 29. The sugar-containing effluent is conveyed through pipe 28, valve 25, and pipe 30 into collecting tank 31. From the tank, the sugar is passed through pipe 32 to the evaporators 33.

When it is desired to recycle a portion of the effluent, it can be routed through pipe 28, valve 25, and pipe 39 to tank 22 and thus used instead of fresh water for diluting the sugar-bearing liquor before admission to the exchanger. This alternative step has the additional advantage of recycling fluids which still contain sugar and putting them through the process again so as to increase the ultimate yield.

The simplicity and efficiency of this method will quickly be apparent to all those skilled in the art from the above description. It will be noted, among other apparent advantages, that a special advantage is derived whenever it is employed to recover sugar from molasses because no cumbersome pretreatment is necessary; the molasses is simply diluted with water and fed right into the ion exchanger without any need for preliminary defecation, clarification, precipitation, etc. A particular advantage is that the ion-exchange resins used in the practice of this invention require, for all practical purposes, a minimum of regenerant. This makes the process even more attractive from an economic viewpoint. Obvious changes or substitutions for the indicated reactants are entirely within the scope of the invention, e.g., practically any inorganic acid solution may be substituted for the sulfuric acid, and any inorganic alkali solution may be used in lieu of the sodium hydroxide. As another obvious alternative, instead of discarding the organic-non-sugars they may be routed to a convenient intermediate repository from which any of the components, such as the amino acids, may be recovered if desired.

Following are a number of examples which are illustrative of the invention. In each example, the method employed comprised the following essentials. Except for Examples 4 and 5, the ion-exchange column was utilized for between 7 and 10 cycles before noting any data in order to bring the resin column to its equilibrium. In those instances where a cation-exchange resin is mentioned, unless otherwise identified, the resin used was a sulfonated styrene composition such as is disclosed in U.S. Patent No. 2,366,007. Where an anion-exchange resin is indicated, a polystyrene quarternary amine type composition was used, such as that disclosed in U.S. Patent No. 2,591,573, unless specifically identified otherwise.

EXAMPLE 1

In actual commercial practice, the process is continuously carried out. However, as a matter of convenience, there is employed in this example approximately 18 liters of the sugar-containing liquor (after diluting 1:1 with water) which results from the first crystallization step 3 in the process shown in Fig. 1. The sugar-containing liquor contains solids comprised of about 74 percent sucrose, about 18.0 percent organic non-sugars, and about 8.0 percent inorganic non-sugars. This liquor, which has a pH of about 5.6, is allowed to percolate through a cation-exchange column at room temperature and at an average rate of flow of about 200 cc. per minute. The column, which is 160 cm. in depth, contains 15 liters of a sulfonated cation-exchange resin in the sodium form except for the uppermost fourth of the column which is in the hydrogen form at the outset. The column is prepared by using a commercially available resin known to have been made by copolymerizing about 92 to 96 parts of styrene and about 4 to 8 parts of divinylbenzene, then sulfonating the product and water-washing to get rid of the unused acid. The conversion of approximately the upper fourth of this resin to the hydrogen form is accomplished by adding 200 grams of 66° Baumé sulfuric acid.

Water is pumped into the column behind the sugar-containing liquor. Small samples of the effluents from the column are taken and analyzed rapidly to determine the sugar and non-sugar contents thereof. When the sugar and non-sugar content dwindles away almost to zero, the succeeding effluents, which have a pH of 3, are collected in a separate vessel. The preceding effluents containing the non-sugars are in the meantime diverted to another place for processing to recover the amino acids, etc.

Simultaneously, another three-and-a-half liters of this same sugar-containing liquor are allowed to percolate in a similar manner through an equivalent-sized ion-exchange column. This column, however, contains a commercially available polystyrene quaternary amine type resin, the lower three-fourths of which is in the chloride form. This resin is known to have been made by reacting a crosslinked polymerized monovinyl aromatic compound, such as styrene, with a chloromethylating agent and then reacting the chloromethylated polymer with a tertiary amine. The uppermost fourth of the column contains beads which originally were in the chloride form but which are converted into the hydroxyl form by passing a small amount of a dilute solution of sodium hydroxide down through the column at the outset.

Water is pumped into the column behind the sugar-bearing liquor. Small samples of the effluents from the column are repeatedly taken and analyzed to determine the sugar and non-sugar contents thereof. When the non-sugar content dwindles away almost to zero, the succeeding effluents which have a combined pH of 11–12 are collected in a separate vessel. In the meantime, the preceding effluents containing the non-sugars are diverted to another place for amino acid recovery processing. As the sugar-containing effluents from the first and second ion-exchange columns are admitted to their respective receptacles, a stream from each of these receptacles is passed into a third mixing receptacle which is equipped with a constant reading pH meter. One stream or the other is increased or decreased as the need appears in order to maintain the pH of the mixed stream at a constant value between 5 and 9, preferably 7–9. This mixed stream is passed to an evaporative apparatus for crystallizing the pure sugar crystals out of the liquid.

EXAMPLE 2

The same procedure is followed with respect to another sample of sugar-containing liquor as in Example 1, using the ion-exchange column containing the cation-exchange resin down to the point where the sugar-containing effluents having a pH of 3 are collected in a separate receptacle. Then these effluents are passed into an anion-exchange column which is similar in every respect to the cation-exchange column except that it contains a polystyrene base, polyamine type of anion-exchange resin which is made by chloromethylating crosslinked polystyrene and reacting it with a primary or secondary amine to give a weak base resin. The effluent from this second column, which has a pH of 8.0 is passed through an evaporative apparatus to concentrate the pure sugar crystals from the liquid.

EXAMPLE 3

The same procedure is followed with respect to another sample of sugar-containing liquor, as in Example 1, using the ion-exchange column containing the anion-exchange resin down to the point where the sugar-containing effluents having a pH of about 11 are collected in a separate receptacle. Then this effluent is passed into a cation-exchange column which is similar in every respect to the anion-exchange column except that it contains a carboxylic type of cation-exchange resin, such as the commercially available crosslinked polymethacrylic acid resins. The effluent from this second column, which has a pH of 5.5, is passed to an evaporative apparatus to concentrate the pure sugar crystals from the liquid.

EXAMPLE 4

In this instance, the effluents were sampled at five-liter intervals and each sample was analyzed. An anionic column of resin was employed. Approximately 12 kg. of the mother liquor, diluted on a 1:1 by volume basis with the recycled liquor (in lieu of fresh water) from a previous experiment to make up 18 liters, was passed through the column, followed by 160 liters of water. The mother liquor was analyzed and found to consist of:

Solids _____percent__ 72.5
Sucrose _____do____ 55.6
Purity _____do____ 76.7
pH _____do____ 9.8

The results were as follows:

| Effluent Liters, Cumulative | Dry Substances, percent Solids/vol. | Percent Sugar | Purity of Sugar | Non-Sugars, Tot. percent | pH |
|---|---|---|---|---|---|
| 5 | 6.65 | 0.11 | | 6.54 | 11.2 |
| 10 | 5.90 | 0.10 | | 5.80 | 11.0 |
| 15 | 4.75 | 0.08 | | 4.67 | 11.0 |
| 20 | 2.90 | 0.08 | | 2.82 | 11.0 |
| 25 | 1.10 | 0.06 | | 1.04 | 11.0 |
| 30 | .40 | 0.04 | | .36 | 11.0 |
| 35 | .40 | 0.03 | | .37 | 11.8 |
| 40 | .60 | 0.03 | | .57 | 12.0 |
| 45 | 1.0 | 0 | | 1.0 | 12 |
| 50 | 1.7 | 0.17 | 10 | 1.53 | 12 |
| 55 | 3.10 | .52 | 16.8 | 2.58 | 12 |
| 60 | 5.60 | 2.01 | 35.9 | 3.59 | 12 |
| 65 | 8.55 | 4.46 | 52.2 | 4.09 | 12 |
| 70 | 11.18 | 7.23 | 64.7 | 3.95 | 12 |
| 75 | 12.87 | 9.15 | 74.0 | 3.22 | 12 |
| 80 | 12.42 | 9.60 | 77.3 | 2.82 | 12 |
| 85 | 11.65 | 9.97 | 85.6 | 1.68 | 12 |
| 90 | 10.80 | 9.49 | 87.9 | 1.31 | 12 |
| 95 | 10.20 | 9.13 | 89.5 | 1.07 | 12 |
| 100 | 9.82 | 8.78 | 89.4 | 1.04 | 12 |
| 105 | 9.28 | 8.39 | 90.4 | .89 | 12 |
| 110 | 8.42 | 7.76 | 92.2 | .66 | 12 |
| 115 | 7.00 | 6.65 | 95 | .35 | 11.6 |
| 120 | 5.80 | 5.58 | 96.2 | .22 | 11.2 |
| 125 | 4.80 | 4.64 | 96.7 | .16 | 11.0 |
| 130 | 3.90 | 3.78 | 96.9 | .12 | 10.8 |
| 135 | 3.15 | 3.05 | 96.8 | .10 | 10.8 |
| 140 | 2.65 | 2.57 | 97.0 | .08 | 10.8 |
| 145 | 2.25 | 2.25 | 100 | 0 | 10.8 |
| 150 | 2.03 | 1.95 | 96.1 | .08 | 10.8 |
| 155 | 1.80 | 1.74 | 97.7 | .06 | 11.0 |
| 160 | 2.00 | 1.71 | 85.5 | .29 | 11.8 |
| 165 | 2.59 | 1.72 | 66.4 | .87 | 11.8 |
| 170 | 3.25 | 1.81 | 55.7 | 1.44 | 11.8 |
| 175 | 4.15 | 1.73 | 41.7 | 2.42 | 11.7 |
| 180 | 5.15 | 1.80 | 35 | 3.35 | 11.5 |

Average composition of cuts 16-30 (liters 80 to 150) which contained main body of sugar:

Percent solids _____ 7.00
Percent sucrose _____ 6.25
Percent purity _____ 89.4
pH _____ 11.6

This data is represented graphically in Fig. 4.

EXAMPLE 5

In this instance, the mother liquor was exactly the same as in the preceding example with respect to quantity, analysis, dilution, etc. The only difference was that a cationic column was employed. The results were as follows:

| Effluent Liters, Cumulative | Dry Substances, percent Solids/vol. | Percent Sugar | Purity of Sugar | Non-Sugars, Tot. percent | pH |
|---|---|---|---|---|---|
| 10 | 0.50 | 0.04 | | 0.46 | 2.2 |
| 15 | 0.40 | 0 | | 0.40 | 2.35 |
| 20 | 0.50 | 0 | | 0.50 | 2.35 |
| 25 | 0.70 | 0.21 | | 0.49 | 2.35 |
| 30 | 1.85 | 1.22 | 65.9 | 1.63 | 2.10 |
| 35 | 4.50 | 3.79 | 84.2 | 1.71 | 1.85 |
| 40 | 8.45 | 7.51 | 88.9 | 0.94 | 1.70 |
| 45 | 12.8 | 11.75 | 92.1 | 1.01 | 1.60 |
| 50 | 16.4 | 15.24 | 92.8 | 1.18 | 1.60 |
| 55 | 17.6 | 16.38 | 93.0 | 1.24 | 1.60 |
| 60 | 16.6 | 15.25 | 91.8 | 1.37 | 1.80 |
| 65 | 14.4 | 12.89 | 89.4 | 1.51 | 2 |
| 70 | 11.75 | 10.11 | 86.0 | 1.64 | 2.30 |
| 75 | 9.35 | 7.68 | 82.1 | 1.67 | 2.20 |
| 80 | 7.46 | 5.69 | 76.3 | 1.77 | 2.25 |
| 85 | 5.92 | 4.22 | 71.3 | 1.55 | 2.25 |
| 90 | 4.72 | 3.17 | 67.2 | 1.72 | 2.35 |
| 95 | 3.84 | 2.39 | 62.2 | 1.45 | 2.40 |
| 100 | 3.10 | 1.84 | 59.4 | 1.26 | 2.35 |
| 105 | 2.56 | 1.40 | 54.6 | 1.16 | 2.40 |
| 110 | 1.95 | 1.00 | 51.2 | 0.85 | 2.45 |
| 115 | 1.75 | 0.83 | 47.3 | 0.92 | 2.45 |
| 120 | 1.60 | 0.67 | 41.8 | 0.93 | 2.15 |
| 125 | 2.03 | 0.52 | 25.6 | 1.51 | 1.45 |
| 130 | 2.80 | 0.42 | 15.0 | 2.38 | 1.25 |
| 135 | 3.70 | 0.35 | 9.47 | 3.40 | 1.15 |
| 140 | 4.83 | 0.31 | 6.42 | 4.52 | 1.05 |
| 145 | 5.45 | 0.28 | 5.14 | 5.17 | 0.80 |
| 150 | 5.35 | 0.27 | 5.05 | 5.08 | 0.90 |
| 155 | 4.55 | 0.24 | 5.3 | 4.31 | 0.90 |
| 160 | 3.10 | 0.21 | 6.8 | 2.89 | 1.15 |
| 165 | 1.90 | 0.16 | 8.4 | 1.74 | 1.30 |
| 170 | 1.15 | 0.13 | | 1.02 | 1.55 |
| 175 | 0.80 | 0.10 | | 0.70 | 1.75 |
| 180 | 0.60 | 0.08 | | 0.52 | 1.95 |

Average composition of cuts 6–18 (liters 35–95) containing the main body of sugar:

Percent solids _____ 10.36
Percent sucrose _____ 9.0
Percent purity _____ 87.0
pH _____ 1.95

This data is represented graphically in Fig. 5.

The following examples (6 to 12) relate to the use of the present invention to produce sugar from all types of molasses products. The ease and efficiency with which the invention operates to obtain sugar from such sources, as is illustrated in these examples, can be better appreciated if one is cognizant of the comparative failure of the prior art to develop a satisfactory method for that purpose. (Of course, it is contemplated that, if sugar manufacturers utilize the present invention earlier in their manufacturing operations, there will be little molasses to treat in this manner.)

It is well known that molasses, depending upon the origin of the product, contains about 60 percent sugar. This source of sugar has for quite some time been looked upon by manufacturers as one which could be extremely profitable to their industry. The savings would obviously be very large.

Although the value of obtaining sugar from molasses has been well known, it has until the present time not been commercially feasible from an economic standpoint. Some workers have tried to apply various ion-exchange techniques to the problem because such processes have been utilized successfully in purifying sugar from beet juices and the like, but heretofore such efforts to get sugar from molasses have met with failure.

In each of Examples 6 to 12 about 15 liters of the resin were utilized, this amount making a resin bed of approximately 160 cm. in height. In Examples 6 to 9, an anion-exchange resin was employed, and in each cycle there were employed 2.1 kilograms of molasses diluted with 2.1 kilograms of water, making a total of 4.2 kilograms which quantity corresponds to about 3.6 liters of solution. This amount of solution was equal to about 24 per cent of the volume of resin.

The succession of operations was as follows:

(1) Introduction in the column of 3.6 liters of diluted molasses;

(2) Introduction in the column of 7.4 liters of water;

(3) Introduction in the column of 0.5 liter of a 20% NaOH solution;

(4) Introduction in the column of 15.5 liters of water.

The following effluents were collected:

(1) First 6.0–8.0 liters contained water, inorganic non-sugars, no sugar, very little organic non-sugars; this effluent was discarded;

(2) Next 2.0 liters contained water solution of a little sugar mixed with a portion of the organic non-sugars; this effluent was recycled and used to dilute the influent molasses;

(3) The third effluent, of some 7.0 liters, contained the bulk of the sugar and a little of the organic non-sugars; this was set aside for separating out of the sugar by conventional concentration techniques;

(4) The fourth effluent, of some 2.0 liters, contained some small amount of the sugar and non-sugars; it was discarded;

(5) The last effluent, of some 8.0 liters, contained water with no sugar but with the rest of the organic non-sugars; this was put aside.

The specific data and graphs which follow will not indicate the fact that a considerable portion of the non-sugars has been removed in the first few liters of effluent. However, this fact should be understood.

EXAMPLE 6

A column containing particles of a polystyrene quaternary amine type of anion-exchange resin in the chloride form was prepared using the Amberlite IRA–400 type of resin manufactured by the Rohm & Haas Company, Philadelphia, Pennsylvania. This resin was known to have been made by reacting a cross-linked polymeric, monovinyl, aromatic compound, such as styrene, with a chloromethylating agent and then reacting the chloromethylated polymer with a tertiary amine. The column of resin beads was 160 cm. in depth. About 3.6 liters of a molasses solution, made up on a 1:1 weight basis of 1.5 liters of molasses and 2.1 liters of water, having a specific gravity of 1.4 and kept at an ambient temperature of about 23° C., was allowed to percolate through the column at an average rate of flow of about 200 cc. per minute. Analyses of the dilute molasses solution showed that it had a pH of 9.25 and contained 41.04 percent of dry substances, as determined refractometrically, of which 23.80 percent was saccharose, as determined refractometrically, and the balance of 17.24 percent was made up of non-sugars. The average purity of the sugar, as determined by the proportion, sugar/dry substances, was 57.99 percent.

In order to determine how effectively the column was seperating out the sugar from the non-sugars, samples of each successive liter of effluent were separately taken and analyzed, starting from the sixth liter. The results are tabulated below and are also represented graphically in Fig. 6.

| Effluent Sample | Dry Substances, Percent Solids/vol. | Percent Sugar | Purity of Sugar | Non-Sugars, Tot. Percent | pH |
|---|---|---|---|---|---|
| 6th liter | 0.20 | | | 0.20 | 10.55 |
| 7th liter | 1.85 | | | 1.85 | 11.20 |
| 8th liter | 8.75 | 1.20 | 13.71 | 7.55 | 12.50 |
| 9th liter | 17.52 | 7.84 | 44.75 | 9.68 | 12.50 |
| 10th liter | 22.30 | 14.54 | 65.20 | 7.76 | 12.50 |
| 11th liter | 21.88 | 15.90 | 72.67 | 5.98 | 12.50 |
| 12th liter | 18.28 | 13.90 | 76.04 | 4.38 | 12.50 |
| 13th liter | 14.85 | 11.40 | 76.77 | 3.45 | 12.40 |
| 14th liter | 12.27 | 9.62 | 78.40 | 2.65 | 12.40 |
| 15th liter | 8.62 | 6.84 | 79.35 | 1.78 | 12.30 |
| 16th liter | 6.62 | 5.24 | 79.15 | 1.38 | 12.30 |
| 17th liter | 5.23 | 4.17 | 79.73 | 1.06 | 12.10 |
| 18th liter | 4.27 | 2.76 | 64.64 | 1.51 | 12.10 |
| 19th liter | 6.77 | 1.32 | 19.50 | 5.45 | 12.10 |
| 20th liter | 7.53 | 0.30 | | 7.23 | 12.30 |
| 21st liter | 6.32 | −0.10 | | 6.32 | 12.10 |
| 22d liter | 5.47 | −0.16 | | 5.47 | 12.10 |
| 23d liter | 3.87 | −0.04 | | 3.87 | 12.20 |
| 24th liter | 0.92 | | | 0.92 | 10.55 |
| 25th liter | 0.20 | | | 0.20 | 9.57 |
| 26th liter | 0.10 | | | 0.10 | 9.41 |
| 27th liter | 0.05 | | | 0.05 | 9.32 |

EXAMPLE 7

The same procedure was repeated as in Example 6 with the following exceptions or changes. The ambient temperature was still 23° C., but the average rate of flow of the molasses solution through the column was about 180 cc. per minute. Analyses of the dilute molasses solutions showed that it had a specific gravity of 1.4, a pH of 8.95, and contained 40.90 percent of dry substances, of which 23.70 percent was saccharose and the balance of 17.20 percent was made up of non-sugars. The average purity of the sugar, as determined by the proportion of sugar:dry substances, was 57.85 percent. The results, again starting from the sixth liter to be passed through the ion-exchange column, are tabulated below and are also represented graphically in Fig. 7.

| Effluent Sample | Dry Substances, Percent Solids'vol. | Percent Sugar | Purity of Sugar | Non-Sugars, Tot. Percent | pH |
|---|---|---|---|---|---|
| 6th liter | 0.30 | | | 0.30 | 10.20 |
| 7th liter | 1.74 | 0.12 | | 1.62 | 10.70 |
| 8th liter | 8.22 | 0.80 | 9.73 | 7.42 | 11.85 |
| 9th liter | 16.52 | 6.94 | 42.01 | 9.58 | 12.10 |
| 10th liter | 20.69 | 13.30 | 64.28 | 7.39 | 12.10 |
| 11th liter | 21.64 | 15.44 | 71.35 | 6.20 | 12.05 |
| 12th liter | 20.04 | 14.78 | 73.75 | 5.26 | 12.05 |
| 13th liter | 17.92 | 13.60 | 75.89 | 4.32 | 11.95 |
| 14th liter | 13.81 | 10.84 | 78.49 | 2.97 | 11.90 |
| 15th liter | 10.49 | 8.40 | 80.08 | 2.09 | 11.95 |
| 16th liter | 7.65 | 6.11 | 79.87 | 1.54 | 11.75 |
| 17th liter | 3.87 | 3.16 | 81.65 | 0.71 | 11.60 |
| 18th liter | 2.30 | 1.75 | 76.09 | 0.55 | 11.10 |
| 19th liter | 4.12 | 0.42 | 10.19 | 3.70 | 11.65 |
| 20th liter | 6.98 | | | 6.98 | 11.50 |
| 21st liter | 6.78 | −0.06 | | 6.78 | 11.40 |
| 22d liter | 6.48 | −0.24 | | 6.48 | 11.30 |
| 23d liter | 5.08 | −0.30 | | 5.09 | 11.30 |
| 24th liter | 1.96 | −0.04 | | 1.96 | 11.30 |
| 25th liter | 0.20 | | | 0.20 | 10.35 |
| 26th liter | 0.10 | | | 0.10 | 9.90 |
| 27th liter | 0.05 | | | 0.05 | 9.40 |

EXAMPLE 8

The same procedure was repeated as in Example 6 with the following exceptions or changes. The molasses solution was prepared as stated above and maintained at the same ambient temperature of 23° C., but at a flow rate of 186 cc. per minute. Analyses of the dilute molasses solution showed that it had a specific gravity of 1.4, a pH of 9.25, and contained 40.94 percent of dry substances, of which 23.70 percent was saccharose, and the balance of 17.24 percent was made up of non-sugars. The average purity of the sugar, as determined by the proportion, sugar/dry substances, was 57.89 percent. The results, again starting from the sixth liter to be passed through the ion-exchange column, are tabulated below and are represented graphically in Fig. 8.

| Effluent Sample | Dry Substances, Percent Solids/vol. | Percent Sugar | Purity of Sugar | Non-Sugars, Tot. Percent | pH |
|---|---|---|---|---|---|
| 6th liter | 0.25 | | | 0.25 | 10.30 |
| 7th liter | 2.75 | | | 2.75 | 11.70 |
| 8th liter | 10.24 | 1.64 | 16.02 | 8.70 | 12.10 |
| 9th liter | 18.85 | 7.50 | 39.79 | 11.35 | 12.10 |
| 10th liter | 23.14 | 13.30 | 57.48 | 9.84 | 12.10 |
| 11th liter | 23.17 | 15.54 | 67.07 | 7.63 | 12.10 |
| 12th liter | 18.78 | 14.58 | 77.64 | 4.20 | 12.00 |
| 13th liter | 14.19 | 11.24 | 79.21 | 2.95 | 11.95 |
| 14th liter | 12.22 | 9.60 | 78.56 | 2.65 | 11.90 |
| 15th liter | 10.07 | 8.01 | 79.54 | 2.06 | 11.85 |
| 16th liter | 6.46 | 5.28 | 81.73 | 1.18 | 11.70 |
| 17th liter | 2.97 | 2.47 | 83.16 | 0.50 | 11.65 |
| 18th liter | 1.62 | 0.72 | 44.44 | 0.90 | 11.60 |
| 19th liter | 5.18 | 0.22 | | 4.96 | 11.50 |
| 20th liter | 8.82 | | | 8.82 | 11.30 |
| 21st liter | 8.21 | −0.14 | | 8.21 | 11.30 |
| 22d liter | 6.67 | −0.01 | | 6.67 | 11.10 |
| 23d liter | 2.65 | | | 2.65 | 11.10 |
| 24th liter | 0.30 | | | 0.30 | 10.40 |
| 25th liter | 0.20 | | | 0.20 | 10.35 |
| 26th liter | 0.10 | | | 0.10 | 9.95 |
| 27th liter | 0.05 | | | 0.05 | 9.75 |

EXAMPLE 9

A procedure similar to that of Example 6 was employed with the following exceptions or changes. In each cycle there were employed approximately 1.6 kilograms of molasses diluted with 2.1 kilograms of water, making a total of 3.7 kilograms of solution, which amount corresponds to about 3.3 liters. This amount of solution was equal to about 22 per cent of the volume of the resin.

The succession of operations was as follows:
(1) Introduction in the column of 3.3 liters of diluted molasses;
(2) Introduction in the column of 12.0 liters of water;
(3) Introduction in the column of 0.5 liter of dilute NaOH solution;
(4) Introduction in the column of 11.95 liters of water.

The following effluents were collected:
(1) First 7.0 liters contained water, no sugar, very little non-sugars; this effluent was discarded.
(2) Next 1.5 liters contained water solution of a little sugar mixed with mostly inorganic non-sugars; this effluent was recycled and used to dilute the influent molasses.
(3) The third effluent, of some 7.0 liters, contained the bulk of the sugar and a little of the non-sugars; this was set aside for separating out the sugar by conventional concentration techniques.
(4) The fourth effluent, of approximately 1.5 liters, contained a small amount of the sugar and non-sugars; it was discarded.
(5) The last effluent, of some 10.0 liters, contained water with no sugar but had the bulk of the organic non-sugars; this was routed to a convenient intermediate repository from which any of the components such as the amino acids could be recovered or discarded as may be preferred.

The molasses solution was prepared by mixing together, as indicated above, 1.2 liters of molasses with 2.1 liters of water. It was maintained at an ambient temperature of 27° C., and at a flow rate of 158 cc. per minute. Analyses of the dilute molasses solution showed that it had a pH of 9.25, and contained 37.2 percent of dry substances, of which 22.2 percent was saccharose, and the balance of 15.0 percent was made up of non-sugars. The average purity of the sugar, as determined by the proportion, sugar/dry substances, was 59.67 percent. The results, again starting from the sixth liter to be passed through the ion-exchange column, are tabulated below and are represented graphically in Fig. 9.

| Effluent Sample | Dry Substances, Percent Solids/vol. | Percent Sugar | Purity of Sugar | Non-Sugars, Tot. Percent | pH |
|---|---|---|---|---|---|
| 6th liter | 1.15 | 0.20 | | 1.15 | 12.5 |
| 7th liter | 3.20 | 0.10 | | 3.20 | 12.8 |
| 8th liter | 7.30 | 2 | 27.39 | 5.30 | 13 |
| 9th liter | 12.10 | 5.60 | 46.28 | 6.50 | 13 |
| 10th liter | 16.40 | 10.10 | 61.58 | 6.30 | 12.95 |
| 11th liter | 18.80 | 13 | 69.14 | 5.80 | 12.75 |
| 12th liter | 16.85 | 12.79 | 75.90 | 4.06 | 12.45 |
| 13th liter | 12.70 | 10.61 | 83.54 | 2.09 | 12 |
| 14th liter | 8.60 | 7.68 | 89.30 | 0.92 | 11.60 |
| 15th liter | 8.55 | 5.02 | 90.45 | 0.53 | 11.30 |
| 16th liter | 3.55 | 3.26 | 91.83 | 0.29 | 11.45 |
| 17th liter | 2.25 | 2.10 | 93.33 | 0.15 | 11.35 |
| 18th liter | 1.80 | 1.32 | 73.33 | 0.48 | 11.80 |
| 19th liter | 2.60 | 0.5 | | 1.79 | 12.10 |
| 20th liter | 4.60 | 0.2 | | 4.07 | 12.20 |
| 21st liter | 7.80 | 0.40 | | 7.40 | 12.20 |
| 22d liter | 10 | 0.00 | | 10 | 11.95 |
| 23d liter | 6.10 | 0.10 | | 6.10 | 12 |
| 24th liter | 1.20 | 0.30 | | 1.20 | 11.20 |
| 25th liter | 0.20 | 0.20 | | 0.20 | 11.20 |
| 26th liter | 0.10 | 0 | | 0.10 | 11 |
| 27th liter | 0 | 0 | | 0 | 11.50 |

In the following examples (10 to 12) about 15 liters of a cation-exchange resin were utilized in a column 160 cm. in height. In each cycle, there were employed 2.1 kilograms of molasses diluted with 1.5 kilograms of water, making a total of 3.6 kilograms which corresponded to about 3.0 liters of solution. This amount of solution is equal to about 20 percent of the volume of the resin.

The succession of operations was as follows:
(1) Introduction in the column of 3.0 liters of diluted molasses;
(2) Introduction in the column of 12.0 liters of water;
(3) Introduction in the column of 2.1 liters of a 10 percent $H_2SO_4$ solution;
(4) Introduction in the column of 9.9 liters of water.

The following effluents were collected:
(1) First 7.0 liters contained inorganic non-sugars, no sugar, and very little organic non-sugars; this effluent was discarded;
(2) Next 7.0 liters contained the bulk of the sugar and a little of the organic non-sugars; this was set aside for separating out the sugar by conventional concentration techniques;
(3) Next 1.5 liters contained some residual sugar and some organic non-sugars; this was set aside for use in diluting the next batch of molasses to be put through the column;
(4) Next 1.5 liters contained a small amount of sugar but more organic non-sugars; this was discarded;
(5) Final effluent of approximately 10.0 liters contained water with no sugar but with the bulk of the organic non-sugars; this was discarded.

As in the case with the anion-exchange column, the specific data and graphs which follow will not indicate the fact that a considerable portion of the non-sugars has been removed in the first few liters of effluent. However, this fact should be understood.

EXAMPLE 10

A column containing particles of a sulfonated cation-exchange resin in the sodium form was prepared using the Amberlite XE–100 resin manufactured by the Rohm & Haas Company, Philadelphia, Pennsylvania. This resin was known to have been made by copolymerizing styrene and divinylbenzene, then sulfonating the product. The column of resin beads was 160 cm. in depth. Three liters of a molasses solution, diluted 1:1 by volume with water, having a specific gravity of 1.4 and kept at an ambient temperature of about 8° C., were allowed to percolate through the column at an average rate of flow of about 123 cc. per minute. Analyses of the dilute molasses solution showed that it had a pH of 9.5 and contained 49.75 percent of dry substances, as determined refractometrically, of which 30.60 percent was saccharose, as determined polarimetrically, and the balance of 19.15 percent was made up of non-sugars. The average purity of the sugar, as determined by the proportion, sugar/dry substances, was 61.51 percent.

In order to determine how effectively the column was separating out the sugar from the non-sugars, samples of each successive liter of effluent were separately taken and analyzed, starting from the sixth liter. The results are tabulated below and are also represented graphically in Fig. 10.

| Effluent Sample | Dry Substances, Percent Solids/vol. | Percent Sugar | Purity of Sugar | Non-Sugars, Tot. Percent | pH |
|---|---|---|---|---|---|
| 6th liter | 0.45 | 0.06 | ---------- | 0.40 | 2.55 |
| 7th liter | 1.35 | 0.04 | ---------- | 1.31 | 2.10 |
| 8th liter | 9.45 | 7.87 | 83.28 | 1.58 | 1.80 |
| 9th liter | 20.00 | 18.31 | 91.55 | 1.69 | 2.55 |
| 10th liter | 22.10 | 20.34 | 92.04 | 1.76 | 2.60 |
| 11th liter | 19.20 | 16.70 | 87.19 | 2.50 | 2.75 |
| 12th liter | 16.85 | 13.83 | 82.08 | 3.02 | 2.95 |
| 13th liter | 11.25 | 7.67 | 68.18 | 3.58 | 3.10 |
| 14th liter | 8.45 | 4.50 | 53.25 | 3.95 | 3.20 |
| 15th liter | 6.35 | 2.30 | 36.22 | 4.05 | 2.70 |
| 16th liter | 5.20 | 1.00 | 19.23 | 4.20 | 3.05 |
| 17th liter | 3.65 | 0.10 | ---------- | 3.55 | 3.25 |
| 18th liter | 2.10 | ---------- | ---------- | 2.10 | 2.75 |
| 19th liter | 1.60 | ---------- | ---------- | 1.60 | 2.50 |
| 20th liter | 2.70 | ---------- | ---------- | 2.70 | 2.20 |
| 21st liter | 5.00 | ---------- | ---------- | 5.00 | 2.00 |
| 22d liter | 6.75 | ---------- | ---------- | 6.75 | 1.80 |
| 23d liter | 6.95 | ---------- | ---------- | 6.95 | 1.80 |
| 24th liter | 5.30 | ---------- | ---------- | 5.30 | 1.75 |
| 25th liter | 0.70 | ---------- | ---------- | 0.70 | 2.50 |
| 26th liter | 0.55 | ---------- | ---------- | 0.55 | 2.75 |
| 27th liter | 0.40 | ---------- | ---------- | 0.40 | 2.90 |

EXAMPLE 11

The same procedure was repeated as in Example 10 with the following exceptions or changes. The ambient temperature was 17° C., and the average rate of flow of the molasses solution through the column was about 189 cc. per minute. Analyses of the dilute molasses solution showed that it had a specific gravity of 1.4, a pH of 9.8, and contained 49.70 percent of dry substances, of which 30.80 percent was saccharose and the balance of 18.90 percent was made up of non-sugars. The average purity of the sugar, as determined by the proportion of sugar:dry substances, was 61.97 percent. The results, again starting from the sixth liter to be passed through the ion-exchange column, are tabulated and are also represented graphically in Fig. 11.

| Effluent Sample | Dry Substances, Percent Solids/vol. | Percent Sugar | Purity of Sugar | Non-Sugars, Tot. Percent | pH |
|---|---|---|---|---|---|
| 6th liter | 0.30 | 0.07 | ---------- | 0.23 | 2.95 |
| 7th liter | 2.35 | 0.16 | ---------- | 2.19 | 2.70 |
| 8th liter | 9.00 | 7.53 | 83.67 | 1.47 | 2.40 |
| 9th liter | 18.00 | 16.33 | 90.72 | 1.67 | 2.20 |
| 10th liter | 22.85 | 20.93 | 91.60 | 1.92 | 2.40 |
| 11th liter | 21.15 | 18.87 | 89.22 | 2.28 | 2.70 |
| 12th liter | 16.05 | 12.95 | 80.69 | 3.10 | 2.80 |
| 13th liter | 12.50 | 8.89 | 71.12 | 3.71 | 3.00 |
| 14th liter | 9.05 | 5.40 | 59.67 | 3.65 | 3.15 |
| 15th liter | 7.20 | 3.50 | 48.61 | 3.70 | 3.25 |
| 16th liter | 7.60 | 2.50 | 37.88 | 4.10 | 3.40 |
| 17th liter | 4.15 | 0.70 | ---------- | 3.45 | 3.55 |
| 18th liter | 4.05 | 0.30 | ---------- | 3.75 | 2.40 |
| 19th liter | 2.30 | 0.10 | ---------- | 2.20 | 2.60 |
| 20th liter | 2.30 | ---------- | ---------- | 2.30 | 2.60 |
| 21st liter | 3.55 | ---------- | ---------- | 3.55 | 2.45 |
| 22d liter | 5.15 | ---------- | ---------- | 5.15 | 2.30 |
| 23d liter | 6.80 | ---------- | ---------- | 6.80 | 2.30 |
| 24th liter | 7.30 | ---------- | ---------- | 7.30 | 2.35 |
| 25th liter | 4.50 | ---------- | ---------- | 4.50 | 2.30 |
| 26th liter | 0.50 | ---------- | ---------- | 0.50 | 3.30 |
| 27th liter | 0.30 | ---------- | ---------- | 0.30 | 3.50 |

EXAMPLE 12

The same procedure was repeated as in Example 10 with the following exceptions or changes. The molasses solution was prepared by mixing together, on a 1:1 by weight basis, 1.5 liters of molasses with 2.1 liters of water, and it was maintained at an ambient temperature of 14° C. The average rate of flow of the molasses solution through the column was about 245 cc. per minute. Analyses of the dilute molasses solution showed that it had a specific gravity of 1.4, a pH of 9.1, and contained 43.40 percent of dry substances, of which 26.10 percent was saccharose, and the balance of 17.30 percent was made up of non-sugars. The average purity of the sugar, as determined by the proportion, sugar/dry substances, was 61.06 percent. The results, again starting from the sixth liter to be passed through the ion-exchange column, are tabulated below and are also represented graphically in Fig. 12.

| Effluent Sample | Dry Substances, Percent Solids/vol. | Percent Sugar | Purity of Sugar | Non-Sugars, Tot. Percent | pH |
|---|---|---|---|---|---|
| 6th liter | 0.15 | ---------- | ---------- | 0.15 | 2.60 |
| 7th liter | 0.60 | 0.14 | 23.33 | 0.46 | 2.00 |
| 8th liter | 2.50 | 1.49 | 59.60 | 1.01 | 1.60 |
| 9th liter | 10.10 | 8.65 | 85.64 | 1.45 | 1.60 |
| 10th liter | 16.20 | 14.69 | 90.68 | 1.51 | 1.60 |
| 11th liter | 18.00 | 16.64 | 92.44 | 1.36 | 2.15 |
| 12th liter | 18.00 | 15.10 | 83.89 | 2.90 | 2.15 |
| 13th liter | 15.95 | 12.85 | 80.56 | 3.10 | 2.40 |
| 14th liter | 14.45 | 11.40 | 78.89 | 3.05 | 2.25 |
| 15th liter | 12.50 | 9.45 | 75.60 | 3.05 | 2.50 |
| 16th liter | 10.20 | 7.10 | 69.61 | 3.10 | 2.40 |
| 17th liter | 5.40 | 1.70 | 31.50 | 3.70 | 2.45 |
| 18th liter | 5.90 | 0.81 | ---------- | 5.09 | 2.30 |
| 19th liter | 7.40 | 0.20 | ---------- | 7.20 | 2.30 |
| 20th liter | 8.19 | 0.10 | ---------- | 8.09 | 2.40 |
| 21st liter | 9.00 | ---------- | ---------- | 9.00 | 2.30 |
| 22d liter | 9.40 | ---------- | ---------- | 9.40 | 2.05 |
| 23d liter | 4.60 | ---------- | ---------- | 4.60 | 2.70 |
| 24th liter | 1.30 | ---------- | ---------- | 1.30 | 2.80 |
| 25th liter | 0.70 | ---------- | ---------- | 0.70 | 3.15 |
| 26th liter | 0.50 | ---------- | ---------- | 0.50 | 3.30 |
| 27th liter | 0.40 | ---------- | ---------- | 0.40 | 3.50 |

The foregoing examples have illustrated the principal process of the invention as it is generally represented in Fig. 1 and as applied to any sugar-bearing liquor, with additional representations of the special case of molasses. The various successive or alternative processes, as represented in Figs. 2–3 and elsewhere described throughout the foregoing specification, are illustrated by the following examples.

EXAMPLE 13

*Molasses (cationic column)*

Through a column 28 cm. in diameter containing a cation resin bed (the top 25% in the acid form) 160 cm. high are pumped in the following order at about 1.33 liters per minute:

(1) 18 liters of a solution obtained by diluting molasses in a ratio of 1:1 with water or with a recycle cut taken from the effluent stream. The undiluted molasses contains approximately 82% solids, 51% sucrose (polarimetrically determined) with an approximate purity of 62%.

(2) 80 liters of water.

(3) 10 liters of 10% $H_2SO_4$.

(4) 72 liters of water.

The effluent cuts are made as follows:

(1) Approximately 30 liters are run into tanks either for disposal or for recovery of by-products.

(2) Approximately 65 liters are collected for concentration.

The necessary neutralization prior to concentration may be carried out in one of a number of ways:

(a) Mixing with the alkaline stream from the anionic column;

(b) Introduction into the alkaline stream of defecated juice;

(c) Chemically or by ion-exchange resins.

This cut has the following approximate composition:

Purity, percent _____ 75–83
Percent solids _____ 9–10
Percent sucrose _____ 6.75–8.1
pH _____ 1.5–3.0

(3) 10 liters of recycle liquor for dilution of the molasses in subsequent cycles;

(4) Approximately 75 liters are run into tanks either for disposal or concentration (as at 11 in Fig. 2) to isolate valuable components.

*Analytical data on cuts 1 and 4*

CUT 1

| | |
|---|---|
| Percent solids | 1.0–1.5. |
| Percent sucrose | About 0.1–0.3. |
| Percent salts | 12.6 (on 100% solids basis). |
| Percent N-free (non-sugar) organics | 29.5 (on 100% solids basis). |
| Percent N-containing organics | 25.4 (on 100% solids basis). |

CUT 4

| | |
|---|---|
| Percent solids | 4–5. |
| Percent sucrose | 0.2–0.4. |
| Percent inorganic salts | 42 (on 100% solids basis). |
| Percent N-free non-sugar organics | 28–29 (on 100% solids basis). |
| Percent N-containing organics | 21–22 (on 100% solids basis). |

EXAMPLE 14

*Molasses (anionic column)*

Through a column with the same dimensions as in Example 13 but containing a bed of anionic resin, the upper 25% (approximately) of which is in the basic form, are pumped in the following order:

(1) 18 liters of molasses solution similar in composition to that of Example 13.

(2) 100 liters of water.

(3) 12 liters of 5% sodium hydroxide.

(4) 50 liters of water.

The effluent cuts are made as follows:

(1) Approximately 65 liters are run into tanks either for disposal or recovery of by-products.

(2) 10 liters are collected as recycling liquor for dilution of the molasses in subsequent cycles.

(3) Approximately 75 liters of solution (containing upwards of 90% of all the sucrose contained in the molasses) are collected for concentration. The necessary neutralization is conducted as in Example 13. This cut as it issues from the column has the following approximate composition:

| | |
|---|---|
| Purity, percent | 75–83 |
| Percent solids | 9–10 |
| Percent sucrose | 6.75–8.1 |
| pH | 11.5–12 |

(4) Approximately 35 liters of liquid are run into tanks either for disposal or for recovery of by-products.

*Analytical data on cuts 1 and 4*

CUT 1

| | |
|---|---|
| Percent solids | 4.4–4.7. |
| Percent sucrose | 0.2–0.4. |
| Percent inorganic salts | 37–40 (100% solids basis). |
| Percent N-free organics | 32–36 (100% solids basis). |
| Percent N-containing organics | 18–21 (100% solids basis). |

CUT 4

| | |
|---|---|
| Percent solids | 2.3–2.6. |
| Percent sucrose | 0.1–0.3. |
| Percent inorganic salts | 26–29 (100% solids basis). |
| Percent N-free organics | 18–22 (100% solids basis). |
| Percent N-containing organics | 20–23 (100% solids basis). |

EXAMPLE 15

This covers the recycling of the by-product (or secondary) molasses ultimately obtained when the solutions in Examples 13 and 14 have been concentrated, and raw sucrose crystallized. Upon centrifugation a new molasses (i.e., molasses from molasses) is obtained. By recycling this the amount of sucrose finally obtained is 75–80% of that originally present in the primary molasses.

The secondary molasses was less viscous, less colored, and less odorous than the primary and had the following constants prior to dilution:

| | |
|---|---|
| Percent solids | 86.4 |
| Percent sucrose | 53.1 |
| Percent purity | 61.4 |
| pH | 9.5 |
| Percent inorganic salts | 11.8 |
| Percent N-free organics | 9.5 |
| Percent N-containing organics | 12.0 |

The operation of the columns was the same as described in Examples 13 and 14. The two product cuts were mixed (as is diagrammatically indicated in Fig. 2 prior to the concentration step 11) and the resultant solution had the following constants:

| | |
|---|---|
| Percent solids | 10.3 |
| Percent sucrose | 8.0 |
| Percent purity | 77.5 |
| pH | 7.7 |

EXAMPLE 16

*Mother liquor (cationic column)*

This covers the upgrading of mother liquor from the centrifugation of raw sugar. It is known also as green sirup. Prior to dilution, the mother liquor had the following constants:

| | |
|---|---|
| Percent solids | 72.5 |
| Percent sucrose | 55.6 |
| Percent purity | 76.7 |
| pH | 9.8 |

Dilution prior to passage through the column was 1:1 with water. The column was operated substantially the same as in Example 13.

The sugar-containing cut (i.e., cut 2) had the following constants:

| | |
|---|---|
| Percent solids | 10.3 |
| Percent sucrose | 9.0 |
| Percent purity | 87.3 |
| pH | 1.95 |

EXAMPLE 17

*Mother liquor (anionic column)*

The diluted mother liquor was passed through the column in essentially the same manner as in Example 14. The sucrose-containing cut (i.e. No. 3) of the effluent had the following constants:

| | |
|---|---|
| Percent solids | 7.0 |
| Percent sucrose | 6.25 |
| Percent purity | 89.4 |
| pH | 11.5 |

EXAMPLE 18

This covers the case where the product cuts from the effluents of the two columns are mixed immediately in preparation for their concentration, exactly as shown in Fig. 2. The cationic and anionic columns are operated in the usual fashion.

The mixed effluent which contains the sucrose has the following constants:

| | |
|---|---|
| Percent solids | 7.8 |
| Percent sucrose | 7.06 |
| Percent purity | 90.5 |
| pH | 9.0 |

This application is a continuation-in-part of my copending U.S. applications Serial Numbers 707,337 and 707,338, both filed January 6, 1958, and now abandoned.

I claim:

1. In a process for recovering sugar from a sugar-bearing fluid containing impurities derived from the natural source of said sugar, the improvement which comprises passing through an ion exchange resin bed, whose particles are in the salt form at least in that half of the bed which extends interiorly from the effluent end with substantially the remainder of the particles which extend interiorly from the influent end having a different form of exchangeable ions derived from a regeneration treatment with a solution of non-salt electrolyte, in repeated cycles (1) the sugar solution, (2) water sufficient to remove the sugar from the bed, (3) a regenerant to essentially restore the form of the resin particles at the influent end of the bed which they had before addition of the sugar solution, (4) water to flush the bed of salts liberated by the regenerant, and withdrawing effluent from the bed during each cycle in at least two portions, one of which contains sugar in relation to impurities in a higher ratio than in the solution passed into the bed.

2. The process of claim 1 wherein the impure sugar-bearing fluid is a mother liquor remaining after the separation of sugar crystals therefrom.

3. The process of claim 1 wherein the impure sugar-bearing fluid is molasses.

4. The process of claim 1 wherein the volume of sugar solution admitted to the bed equals from 5 percent to 35 percent of the bed volume and the volume of water passed through after the sugar solution equals from one to four times the volume of sugar solution.

5. The process of claim 1 followed by the step of adding a solution of a non-salt electrolyte to the effluent portion containing the sugar of higher purity to adjust its pH to a level in the range of between 5 and 9.

6. The process of claim 1 followed by the step of passing the fraction of effluent containing the sugar of higher purity through a bed of weakly polar ion-exchange resin, which has been regenerated with a solution of a non-salt electrolyte and whose exchangeable ions are of a polarity opposite to that of said effluent fraction.

7. The process of claim 1 followed by the step of mixing the fraction of effluent containing the sugar of higher purity with an analogous fraction of effluent withdrawn from a second ion-exchange resin bed, which bed also has particles in the salt form in at least the effluent half thereof and essentially all the particles in the remainder having exchangeable ions derived from a resin regeneration treatment with a solution of a non-salt electrolyte of a polarity opposite to that of the electrolyte in the first named ion-exchange resin bed.

8. In a process of recovering sugar in which a sugar solution derived from the natural source of said sugar is submitted to the steps of clarification, concentration, and crystallization the improvement which comprises diluting a mother liquor from which crystallized sugar has been removed, passing the solution through a column of ion-exchange resin whose particles are in the salt form at least in that half of the bed which extends interiorly from the effluent end with substantially the remainder of the particles which extend interiorly from the influent end having a different form of exchangeable ions derived from regeneration treatment with a solution of a non-salt electrolyte, flushing the residual solution from said column by passing water through, collecting the effluent from said column in at least two fractions one of which contains sugar in relation to impurities in a higher ratio than in the sugar solution passed into the column, concentrating said fraction containing the purified sugar and separating crystallized sugar therefrom.

9. The process of claim 8 wherein the effluent fraction containing the purified sugar is mixed with the sugar solution derived from the natural source prior to the crystallization step which produced the mother liquor.

10. A process of improving the purity of sugar in a solution contaminated with impurities derived from the neutral source of said sugar which comprises passing through an ion-exchange resin bed whose particles are in the salt form at least in that half of the bed which extends interiorly from the effluent end with substantially the remainder of the particles which extend interiorly from the influent end having a different form of exchangeable ions derived from a regeneration treatment with a solution from a non-salt electrolyte, in repeated cycles (1) the sugar solution, (2) water sufficient to remove the sugar from the bed, (3) a regenerant to essentially restore the form of the resin particles at the influent end of the bed which they had before addition of the sugar solution, (4) water to flush the bed of salts liberated by the regenerant; and withdrawing the effluent from the bed during each cycle in at least three fractions, one of which contains sugar in relation to impurities in a substantially higher ratio than in the solution passed into the column, another of which contains sugar in relation to impurities in a substantially lower ratio than in the solution passed into the column, and a third of which contains sugar in relation to impurities which is intermediate the aforementioned two, and recycling the third fraction through the ion-exchange bed.

11. In a process of recovering sugar from a sugar-bearing fluid containing impurities derived from the natural source of said sugar the improvement which comprises passing an aqueous solution containing said sugar and impurities through a column of ion exchange resin, whose particles are in the salt form at least in that half of the bed which extends interiorly from the effluent end with substantially the remainder of the particles which extend interiorly from the influent end having a different form of exchangeable ions derived from a regeneration treatment with a solution of a non-salt electrolyte, flushing the residual solution from said column by passing water through, and collecting the effluent from said column in at least two fractions, one of which contains sugar in relation to impurities in a higher ratio than in the solution passed into the column.

12. A process of recovering sugar from sugar-bearing fluids containing impurities derived from the natural source of said sugar wherein the sugar-bearing solution is passed through a bed of ion exchange resin characterized by passing through an ion exchange resin bed whose particles are in the salt form at least in that half of the bed which extends interiorly from the effluent end with substantially the remainder of the particles which extend interiorly from the influent end having a different form of exchangeable ions derived from a regeneration treatment with a solution of a non-salt electrolyte, in repeated cycles (1) the sugar solution, (2) water sufficient to remove the sugar from the bed, (3) a regenerant to essentially restore the form of the resin particles at the influent end of the bed which they had before the addition of the sugar solution, (4) water to flush the bed of salts liberated by the regenerant; and withdrawing effluent from the bed during each cycle in at least two fractions, one of which contains sugar in relation to impurities in a higher ratio than in the solution passed into the column.

13. In a process of recovering sugar from a sugar-bearing fluid containing impurities derived from the natural source of said sugar, the improvement which comprises passing through an anion exchange resin bed, whose particles are in the salt form at least in that half of the bed which extends interiorly from the effluent end with substantially the remainder of the particles which extend interiorly from the influent end being essentially in the hydroxyl ion form, in repeated cycles (1) the sugar solution, (2) water sufficient to remove the sugar from the bed, (3) a basic regenerant to essentially reconvert the corresponding portion of said anion exchange resin bed to the original form it had before addition of the sugar solution, (4) water to flush the bed of salts liberated by the regenerant, and withdrawing effluent from the bed during each cycle in at least two fractions, one of which contains sugar in relation to impurities in a higher ratio than in the solution passed into the bed.

14. In a process of recovering sugar from a sugar-bearing fluid containing impurities derived from the natural sources of said sugar, the improvement which comprises passing through a cation exchange resin bed, whose particles are in the salt form at least in that half of the bed which extends interiorly from the effluent end with substantially the remainder of the particles which extend interiorly from the influent end being essentially in the hydrogen ion form, in repeated cycles (1) the sugar solution, (2) water sufficient to remove the sugar from the bed, (3) an acidic regenerant to essentially reconvert the corresponding portion of said cation exchange resin bed to the original form it had before addition of the sugar solution, (4) water to flush the bed of salts liberated by the regenerant, and withdrawing effluent from the bed during each cycle in at least two fractions, one of which contains sugar in relation to impurities in a higher ratio than in the solution passed into the bed.

15. In a process of recovering sugar from a sugar-bearing fluid containing impurities derived from the natural source of said sugar, the improvement which comprises dividing said fluid into at least two parts, passing a first one of said fluid parts through an anion exchange resin bed whose particles are in the salt form at least in that half of the bed which extends interiorly from the effluent end with substantially the remainder of the particles which extend interiorly from the influent end being essentially in the hydroxyl ion form, passing a second of said fluid parts through a cation exchange resin bed whose particles are in the salt form at least in that half of the bed which extends interiorly from the effluent end with the remainder of the particles which extend interiorly from the influent end being essentially in the hydrogen ion form, passing sufficient water through said anion exchange resin bed to remove and wash down the sugar as an effluent therefrom, passing sufficient water through said cation exchange resin bed to remove and wash down the sugar as an effluent therefrom, adding sufficient base to the anion exchange bed to regenerate a portion of the resin particles in the influent half to the hydroxyl ion form, adding sufficient acid to the cation exchange bed to regenerate a portion of the resin particles in the influent half to the hydrogen ion form, passing sufficient water through said anion exchange resin bed to flush the bed of salts liberated by the basic regenerant, passing sufficient water through said cation exchange resin bed to flush the bed of salts liberated by the acidic regenerant, and blending the sugar-containing effluents from each of said beds in any desired proportion so as to adjust the pH of the blend to a level in the range between the extremes of each of its components.

16. The process of claim 15 in which the effluent blend is divided into at least two fractions, one of which is drawn off containing sugar in relation to impurities in a higher ratio than in the sugar-bearing fluid which was divided into at least two parts and passed into said ion exchange beds, and the other of which is combined with a succeeding quantity of sugar-bearing fluid which is to be subdivided and passed into the ion exchange beds, the entire process being performed in repeated cycles.

References Cited in the file of this patent
UNITED STATES PATENTS

| | | |
|---|---|---|
| 2,388,195 | Vallez | Oct. 30, 1945 |
| 2,415,936 | Conant | Feb. 18, 1947 |
| 2,528,065 | Lundberg | Oct. 31, 1950 |
| 2,868,677 | Kopke | Jan. 13, 1959 |

UNITED STATES PATENT OFFICE
CERTIFICATION OF CORRECTION

Patent No. 2,971,868                          February 14, 1961

Giuseppe Assalini

It is hereby certified that error appears in the above numbered patent requiring correction and that the said Letters Patent should read as corrected below.

Column 20, line 5, for "neutral" read -- natural --.

Signed and sealed this 20th day of June 1961.

(SEAL)
Attest:

ERNEST W. SWIDER
Attesting Officer

DAVID L. LADD
Commissioner of Patents